US008397157B2

(12) United States Patent
Levy

(10) Patent No.: US 8,397,157 B2
(45) Date of Patent: Mar. 12, 2013

(54) CONTEXT-FREE GRAMMAR

(75) Inventor: Philip Levy, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1022 days.

(21) Appl. No.: 11/584,217

(22) Filed: Oct. 20, 2006

(65) Prior Publication Data

US 2008/0097744 A1   Apr. 24, 2008

(51) Int. Cl.
*G06F 17/20* (2006.01)
*G06F 17/27* (2006.01)
*G06F 17/00* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/28* (2006.01)

(52) U.S. Cl. ............... 715/234; 715/201; 704/1; 704/9
(58) Field of Classification Search ............... 704/1, 9; 715/201, 234
See application file for complete search history.

(56) References Cited

U.S. PATENT DOCUMENTS

| 5,111,398 | A  | * | 5/1992  | Nunberg et al. ........ 704/9 |
| 5,349,526 | A  | * | 9/1994  | Potts et al. ............ 704/9 |
| 5,386,556 | A  | * | 1/1995  | Hedin et al. ............ 1/1 |
| 5,933,822 | A  | * | 8/1999  | Braden-Harder et al. .... 1/1 |
| 5,966,686 | A  | * | 10/1999 | Heidorn et al. .......... 704/9 |
| 5,995,922 | A  | * | 11/1999 | Penteroudakis et al. .... 704/9 |
| 6,115,683 | A  | * | 9/2000  | Burstein et al. .......... 704/1 |
| 6,119,077 | A  | * | 9/2000  | Shinozaki ................ 704/3 |
| 6,138,098 | A  | * | 10/2000 | Shieber et al. ........... 704/257 |
| 6,230,173 | B1 | * | 5/2001  | Ferrel et al. ............. 715/205 |
| 6,243,669 | B1 | * | 6/2001  | Horiguchi et al. ......... 704/9 |
| 6,535,886 | B1 | * | 3/2003  | Koontz .................... 1/1 |
| 6,714,905 | B1 | * | 3/2004  | Chang et al. ............. 704/9 |
| 6,850,252 | B1 |   | 2/2005  | Hoffberg |
| 6,952,666 | B1 | * | 10/2005 | Weise .................... 704/9 |
| 7,003,444 | B2 | * | 2/2006  | Weise .................... 704/9 |
| 7,177,799 | B2 | * | 2/2007  | Calcagno et al. .......... 704/9 |
| 7,765,097 | B1 | * | 7/2010  | Yu et al. ................. 704/9 |
| 2003/0125929 | A1 | * | 7/2003 | Bergstraesser et al. ..... 704/9 |
| 2004/0199870 | A1 | * | 10/2004 | Anderson .............. 715/513 |
| 2005/0154580 | A1 | * | 7/2005 | Horowitz et al. .......... 704/9 |
| 2006/0173985 | A1 |   | 8/2006  | Moore |

FOREIGN PATENT DOCUMENTS

WO   WO-2008051783 A2   5/2008
WO   WO-2008051783 A3   5/2008

OTHER PUBLICATIONS

International Application Serial No. PCT/US07/81739, International Search Report mailed May 2, 2008, 5 pgs.

(Continued)

*Primary Examiner* — Eric Yen
(74) *Attorney, Agent, or Firm* — Schwegman Lundberg Woessner P.A.

(57) ABSTRACT

In one embodiment, a method comprising accessing a first data object and a second data object of a data structure representing electronic content, the second data object being associated with the first data object, selecting, based on first content included in the first data object, a grammar rule included in a grammar, the grammar rule including a grammar rule item, and based on second content included in the second data object, selecting the grammar rule item included in the grammar rule, and based on the second content and the grammar rule item, generating a portion of a textual representation of the electronic content.

41 Claims, 25 Drawing Sheets

OTHER PUBLICATIONS

International Application Serial No. PCT/US07/81739, Written Opinion mailed May 2, 2008, 10 pgs.

Bontcheva, K., et al., "Evolving GATE to Meet New Challenges in Language Engineering", *In natural language engineering;* vol. 10 (3-4), (Feb. 12, 2004), 349-373.

"Context-free grammar", http://en.wikipedia.org/wiki/Context-free_grammar, (Accessed Jun. 28, 2007), 7 pgs.

"Parsing", http://en.wikipedia.org/wiki/Parsing, (Accessed Jun. 28, 2007), 5 pgs.

"Parsing expression grammar", http://en.wikipedia.org/wiki/Parsing_expression_grammar, (Accessed Jun. 28, 2007), 6 pgs.

* cited by examiner

*FIG. 4A*

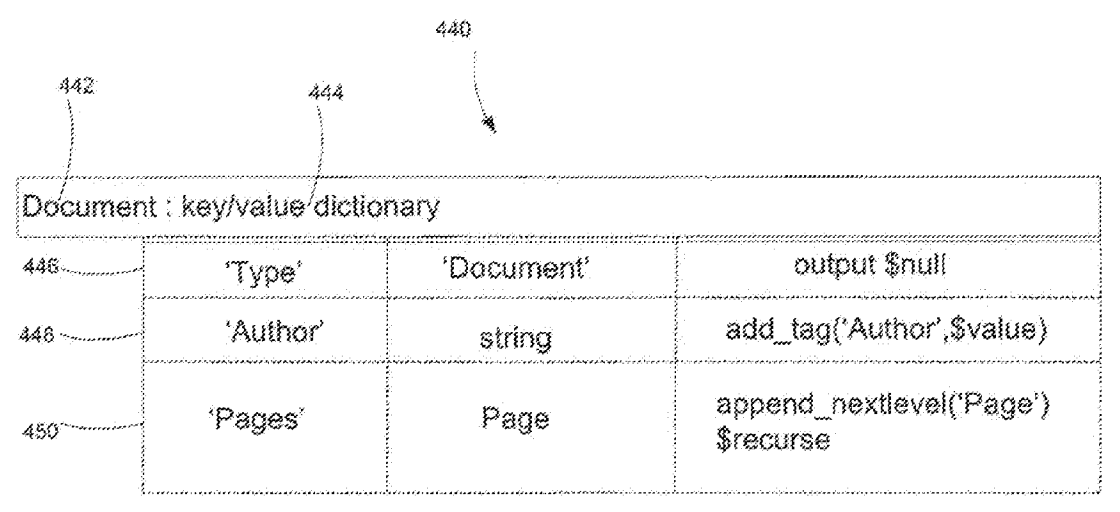

| Document : key/value dictionary | | |
|---|---|---|
| 'Type' | 'Document' | output $null |
| 'Author' | string | add_tag('Author',$value) |
| 'Pages' | Page | append_nextlevel('Page') $recurse |

FIG. 4C

Page : key/value dictionary

| 'Type' | 'Page' | output $null |
|---|---|---|
| 'Page_Number' | integer | add_atrib(pagenum,$value) |
| 'Content' | content_array | append_nextlevel('Content') $recurse |

$include(general_object_rule_items)

general_object_rule_items : key/value dictionary

| 'ID' | string | add_attribute(id,$value) |
|---|---|---|
| 'Date_Added' | date_stamp | append_nextlevel('DateAdded') $recurse |

File trfile.xml

```
...
...
    <Page_with_image pagenum=4>
        <Binary_data file="binary23.bin"/>
    </Page>
...
...
```

1602

File binary23.bin

```
<Object identity="A"/>
  <Children>
    <Object identity="B"/>
      <Children>                              1802
        <Object identity="D"/>
        </Object>                     1804
      </Children>
    </Object>
    <Object identity="C"/>
      <Children>
        <Ref_Obj identity="D"/>       1806
        <Object identity="E"/>
          <Children>
            <Object identity="F"/>
              <Children>
                <Ref_Obj identity="A"/>
              </Children>
            </Object>
          </Children>
        </Object>
      </Children>
    </Object>
  </Children>
</Object>
```

CONTEXT-FREE GRAMMAR

FIELD

This application relates to a method and system to enable grammar-based data structure processing of electronic content, and, in one example embodiment, to enable translation using a grammar and parser formulation to do bi-directional translation between two storage or electronic content.

BACKGROUND

In recent years, a number of computerized applications for storing, retrieving, and displaying electronic content have come into wide use. With the advent of object-oriented and object-based paradigms throughout the software industry, the electronic content processed by such programs has been increasingly conceived in terms of a collection of separate objects, each object representing a particular content element, and the various objects structured to form the overall electronic content by being interconnected through a graph of linking data.

One example of electronic content conceived of as being composed of content elements encapsulated or described by objects is the ADOBE® Portable Document Format (PDF). In a PDF document, various content elements, such as pages, fonts, colour descriptors, graphical elements, and so forth are represented by discrete objects within the document.

Typically, there will be a close relationship between the structure of a file containing the electronic content and the internal, in-memory representation of the electronic content used by an application for rendering or editing the content. For example, a portion of a file describing a particular content element typically corresponds to an object in the internal data structure representing the content, and references within the portion of the file to other portions of the file describing other content elements will typically be mirrored by references from the object in the internal data structure to corresponding other objects in the internal data structure.

Because of this close correspondence, the program code needed to read a file into memory and/or write (or serialize) an in memory representation of electronic content to a file is typically fairly transparent, when the file is to be formatted according to this "native file format." However, if it is found to be desirable to provide a second file structure for storing the content, which might be termed a "non-native file format", particularly if that second file structure is quite different in format from the in-memory representation of the content or its representation in the native format, it is often a large and error-prone programming chore to add the program code to support the non-native file format to the application.

This difficulty is exacerbated by the frequent need to require separately-maintained software modules within the application dedicated to reading in (de-serializing) an electronic content from a file structured according to the non-native format and writing out (serializing) an electronic content to a file structured according to the non-native format.

Similar difficulties arise when it is desired to produce or translate, more or less directly from a file formatted according to the native file format and containing electronic content, a version of the same electronic content in a non-native file format, or vice-versa, especially if the source file includes data that is not part of the specification of the file format of the source file as specified by the format's designers, but rather has been added by other users of the file structure, but which nonetheless ought to be retained in the file into which the file is translated.

Finally, the need to maintain separate pieces of source code for translating from a native file format into a non-native file format, and for serializing an in-memory data structure to a file formatted according to the non-native file format (and perhaps these operations in reverse), can lead to errors and other maintenance issues.

BRIEF DESCRIPTION OF DRAWINGS

Some embodiments are illustrated by way of example and not limitation in the Figures of the accompanying drawings in which:

FIGS. 4A and 4B are block diagrams of example grammar rules that may be used in processing an electronic document stored in an object-based data structure, according to an example embodiment.

FIG. 4C is a block diagram illustrating nesting of grammar rules, according to an example embodiment.

FIG. 16 illustrates a portion of a textual representation as it may be generated using a grammar rule, as well as an auxiliary file that may contain the binary stream data per se, according to an example embodiment.

FIG. 18 illustrates an example of a textual representation of the data structure in FIG. 17, according to an example embodiment.

DETAILED DESCRIPTION

Figure 1:
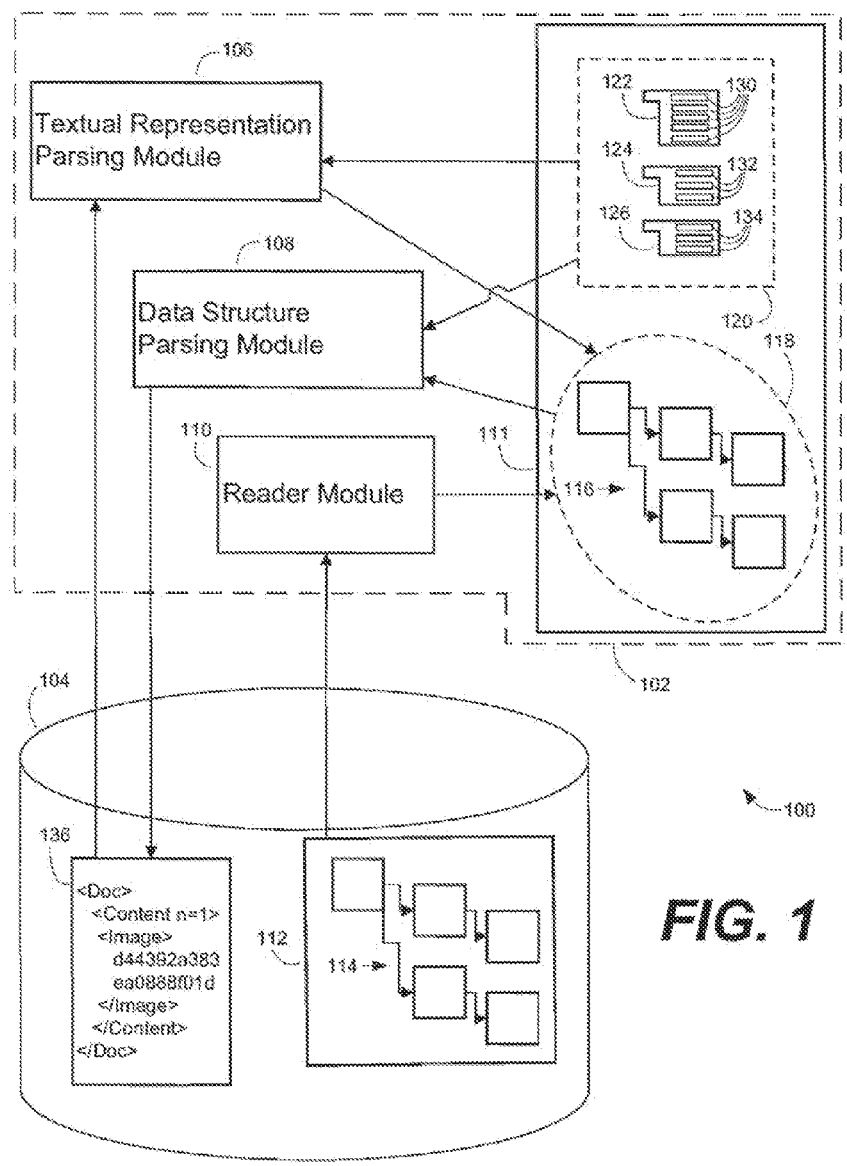
FIG. 1 is a block diagram illustrating a system for processing data structures representing electronic content and producing equivalent markup language representations of the electronic content, and for processing markup language representation of electronic content and producing data structures such as for example, node and link data structures representing the electronic content, according to an example embodiment.

In the following description, for purposes of explanation, numerous specific details are set forth in order to provide a thorough understanding of some example embodiments. It will be evident, however, to one skilled in the art that the present invention may be practiced without these specific details.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Introduction

For the purposes of this specification, the term "electronic content" shall be taken to include any digital data that may be presented to or accessed by a consumer (e.g., visually or audibly presented) and may include an electronic document, page-descriptive electronic content such as a page-descriptive electronic document, media stream, web page, hypertext document, image, digital video, digital audio, an animation, merely for example.

For purposes of this specification, a "content element" shall include any part or share of electronic content that is defined or is discernable as a part or share. For example, a content element may be automatically discerned from a characteristic of the content element itself (e.g., a paragraph of an electronic document) or may be manually defined by a user (e.g., a user-selected collection of words in an electronic document, a user-selected portion of a digital image). Examples of content elements include portions of a page-descriptive document or other electronic document, such as, for example, pieces of electronic text or other material within the electronic document, portions of media streams such as sections of digital video or frames or sets of frames of digital video or digital audio, segments or frames of animations, and various elements presentable or accessible by users within electronic content, and the like. Content elements may include empty content, for example an electronic document may include a blank page; the content of the blank page, namely any data indicating its blankness, may in some embodiments be considered as a content element, namely an empty content element. Content elements may include format data such as, for example, position information describing the placement of other content element(s), or information specifying colors or fonts to be used in rendering other content element(s).

For the purposes of this specification, the term "page description language document" may include a page-descriptive document that is stored in one or more files or other storage units. Such files may, in an example embodiment, be coded in a language suited for describing a rendition of documents (e.g., in a manner in which the documents may be rendered into a set of print pages).

For the purposes of this specification, the term "data structure representing electronic content" may include any arrangement of data into related and identifiable pieces to facilitate rendering and/or processing of the electronic content.

For the purposes of this specification, a "node-and-link representation" may include a data structure in which parts or segments of the electronic content are stored or otherwise associated with identifiable objects (e.g., nodes) and the relationships between the various content elements stored in the nodes are represented by links. The links may serve to connect or join nodes into a configuration and may correspond to relationships between the content elements stored at the respective nodes.

For the purposes of this specification, the term "inter-node link" may include a link in the node-and-link data structure between two nodes. In certain example embodiments, the two nodes may be stored within a memory randomly accessible by a computer.

An inter node link may be unidirectional, in which case it may be traversed by a computational process in one direction from a particular node (which may be termed the "source node") to another node (which may be termed the "sink node"), or an inter node link may be bidirectional—traversable starting from either of the nodes it connects. An inter node or external link may be said to be "incident" to a node if it connects to that node. In some embodiments, links may be extrinsic to the data object describing the node, and in some embodiments, links may be part of the data object describing their source node.

For the purposes of this specification, the term "content portion" may include any portion of an electronic content, such as for example a combination, grouping, or collection, whether user-defined or not, of one or more content elements.

In an example embodiment, a process for recursively processing and traversing a data structure storing electronic content such as an electronic document and writing out the electronic content into an equivalent textual representation is carried out. In another example embodiment, a process for processing a textual representation of electronic content (in some embodiments stored as a markup language document) and constructing an equivalent in-memory node and link representation is carried out.

For the purposes of this specification, the term "grammar" may include a descriptive specification which may be composed of one or more grammar rules that may be used to computationally determine whether electronic content is organized and structured according to the specification and if so, may be used to facilitate deriving a second electronic content having a functional relationship to the first electronic content and its structure or organization.

For the purposes of this specification, the term "data object" may include a portion of the data structure that may be considered a single item for the purposes of processing and which also may (but not necessarily) include a number of parts, fields or other data elements that may be separately accessible within it.

For the purposes of this specification, a grammar may include one or more grammar rules. For the purposes of this specification, a grammar rule may include an aggregate collection of data applicable to the description of a data object and to the representation of the content of the data object in a textual representation. A grammar rule pertaining to a particular type of data object may include an indication of the type of the data object and one or more grammar rule items, each grammar rule item corresponding to a possible or necessary data element stored in or associated with the data object to which the grammar rule pertains.

For the purposes of this specification, the term "grammar rule item" may include a portion of a grammar rule that pertains to a particular required or optional data element within a data object and may include a constant or variable name for a data element to which it pertains, a type indication of the data element to which it pertains, and output control instructions. In some embodiments the output control instructions may be explicitly contained within the grammar rule item, while in some embodiments output control instructions may be implicit in the grammar rule item and determinable by the software or other logic processing a data element in view of the grammar rule item.

For the purposes of this specification, a textual representation of electronic content may include textual elements. For the purposes of this specification, the term "output control instructions" may include machine-readable programming or logic that indicates, during a process of parsing a data structure, textual elements to be written to a textual representation of the data structure that correspond to the content of the data element to which the grammar rule item containing the output control instructions pertains.

For the purposes of this specification, a first textual element may be said to "semantically contain" a second textual element when, for example, a first textual element signifies the presence of a portion of electronic content, associated with the first textual element, where the second textual element includes content that is included in the portion of electronic content. For example, in an Extensible Markup Language (XML) representation, a tag name may semantically contain the tag's attributes and XML text between the start and end tags using the tag name.

For the purposes of this specification, a data element within a data object may be "scalar" in the sense of having a single value such as for example a number or a string indivisible or may be a "compound" data object such as for example another data object, compound data element or the data element may be a reference to another data object.

Example System for Processing Data Structures and Markup Language Representations FIG. 1 is a block diagram illustrating a system 100 for processing data structures representing electronic content and producing equivalent markup language representations of the electronic content, and for processing markup language representation of electronic content and producing data structures such as for example, node and link data structures representing the electronic content, according to an example embodiment.

The region indicated by the dashed shape 102 includes a number of components which may be present in a computer system. These components may include, for example, a textual representation parsing module 106, a data structure parsing module 108, a reader module 110 and a memory 111. In addition, FIG. 1 illustrates a data store 104 which may be, for example a disk, a secondary memory or some other storage device accessible to the processing facilities of a computer. The data store 104 may be included within the computer system or may be, as shown in FIG. 1, separate from the computer system.

As illustrated in FIG. 1, the data store 104 may store diverse types of data in various storage organizations such as files, directory hierarchies and the like. In FIG. 1, the data store 104 is illustrated as containing two files. A file 112 represents a file describing a data structure 114 in which the data objects of the data structure 114 are explicitly described within the file 112 as are the links (e.g., inter-node links) that may be references or other interconnections among the elements of the data structure 114. Although the data structure 114 is illustrated in FIG. 1 in a tree format, in some embodiments the data structure may be in the form of a general graph in which the interconnection relationships among the data objects described in the file 112 may form cycles or loops.

In addition to the data structure file 112, the data store 104 is illustrated as including a textual representation of the electronic content that is stored in the object-based data structure 114 as a textual file 136. In the illustration of FIG. 1 the textual nature of the file 136 is illustrated by the inclusion of extensible markup language (XML)-like text.

FIG. 1 includes an illustration of a memory 111. The memory 111 may include data of various types and arranged in various structures or organizations. The memory 111 may, for example, include an object-based data structure 116 indicated as a whole by the oval 118. The memory 111 may also include a set of grammar rules 122, 124 and 126 that taken together may constitute a grammar. Such a grammar as a whole 120 is indicated by a dashed rectangle. The memory 111 may, in some embodiments, be an example of a grammar store.

As mentioned above, each grammar rule may include one or more grammar rule items. The grammar rule items of grammar rule 122, 124 and 126 are indicated by the rectangles 130, 132 and 134 respectively.

The system 100 may include a reader module 110 to read data structure files such as file 112 into memory 111. The reader module 110 may carry out this function by reading the data in file 112 describing the data structure 114 and reconstructing the corresponding data structure 116 in memory 111 into the region of memory 111.

The data structure parsing module 108 may use the grammar 120 to create a textual representation of the electronic content stored in data structure 116 as described in detail below.

System 100 may also include a textual representation parsing module3 106 which may access a markup language representation such as file 136 and by making use of grammar 120 construct from the markup language representation a corresponding data structure representing the electronic content from the markup language representation such as data structure 116.

The communication between the illustrated files and the regions of memory containing information are illustrated by the arrows interconnecting the various modules illustrated as part of system 100.

Example Processes for Producing Textual Representations of Object-Based Data Structure Representations of Electronic Content Using the Grammar.

The following sections describe an example process for producing a textual representation of an electronic content stored in an object-based data structure according to an example embodiment.

In some embodiments the processing of an object-based data structure 116 may be carried out through a recursive process. In some embodiments, each data object may have a type corresponding to a grammar rule that describes the data elements that may be included within that type of data object and provides output control information to describe how the various data elements within that type of object are to be expressed using textual elements in the corresponding textual representation. The processing of the object-based data structure 116 (which may in some embodiments be in the form of a node and link data structure) may be processed in a recursive way. In those recursive embodiments, the process may begin by identifying a top or root node of the data structure and, based on its type, select a corresponding grammar rule to describe the processing and textual output corresponding to that top node.

As the top node is processed, various other data objects associated with the top node, such as by inclusion or by reference, may have their types determined and processing may recursively continue to the data object associated with the top node. This process may continue until the entire object-based data structure has been processed and a textual representation of its content is written out into a file 136, such as a markup language file.

Thus in some embodiments a basic operation of the processing is to identify the type of a child data object associated to a parent data object within the data structure to output into the textual representation a textual element indicating the beginning of a portion of the textual representation representing the child data object, processing the child data object, possibly including a recursive call to its children, writing out textual representations of scalar data within the child object and finally placing a textual element into the file to indicate that the child element has been written out.

Figure 2:
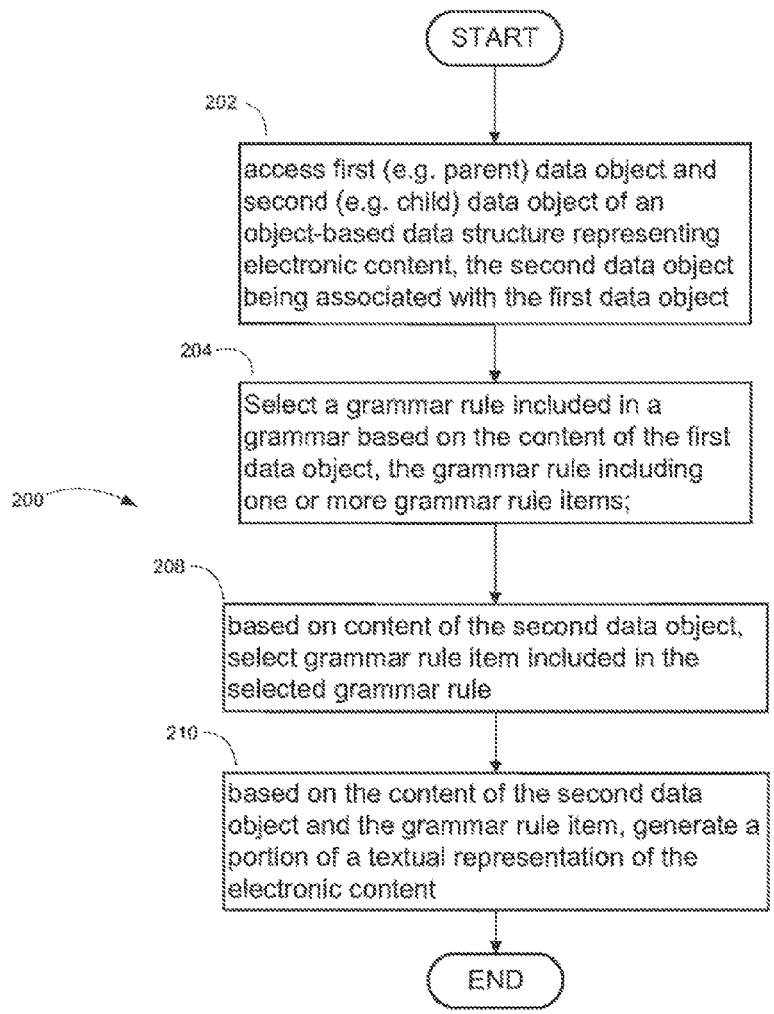
FIG. 2 is a flowchart of the basic operation for processing one data object within the data structure representing the electronic content, according to an example embodiment.

FIG. 2 is a flowchart of the basic operation for processing one data object within the data structure representing the electronic content, according to an example embodiment. At block 202, a first or parent data object and second associated object, such as a child data object in an object-based data structure representing electronic content, are accessed. At block 204 a grammar may be accessed. The grammar may include one or more grammar rules where each grammar rule includes one or more grammar rule items. At block 206 a grammar rule included in a grammar may be selected based on the content of the first data object where the grammar rule includes one or more grammar rule items. The content of the first data object, as used to select the grammar rule, may in some embodiments be a string serving as the key of a key/value pair in which the value is the second or child data object or is a reference to the second data object. At block 208 a grammar rule item (included in the selected grammar rule) may be selected based on the content of a second data object.

For example, if the second data object, which may be the child data object of the first data object, includes a particular piece of data stored as a value in a key/value pair, the grammar rule item may be selected based on the key of the key/value pair such that the selected grammar rule item provides output control instructions to allow the writing out of a textual representation of the key/value pair, on the basis of which the second selected grammar rule item was selected. At block 210 a portion of the textual representation of the electronic content (represented by the object-based data structure as a whole) may be generated. This portion of textual representation may be based on the content of the second data object and the grammar rule item. The grammar rule item may include explicit or implicit output control instructions. In some embodiments, although the portion of the textual representation of the electronic content may be based on the content of the second data object, the portion of the textual representation generated may be based additionally on other data available within the data structure as well.

It will be appreciated that for a particular data object, the processing of blocks 208 and 210 may be repeated to iterate through multiple fields or data elements within the content of the data object, in which a different grammar rule item may be selected for each field. In addition, it will be appreciated that the process 200 may be applied recursively to each field, for example, when the value of a key/value pair is itself a non-scalar data object. In some embodiments, the second data object may be included within the first data object (such as for example as a string or a compound data object within a value of a key/value pair). In some embodiments, the second data object may be a separate object from the first data object, and may be associated to the first object, for example, by reference or pointer.

FIGS. 3 through 6 illustrate various details of a process for producing a textual representation of an object-based data structure using a set of grammar rules included in a grammar, according to an example embodiment.

Figure 3:
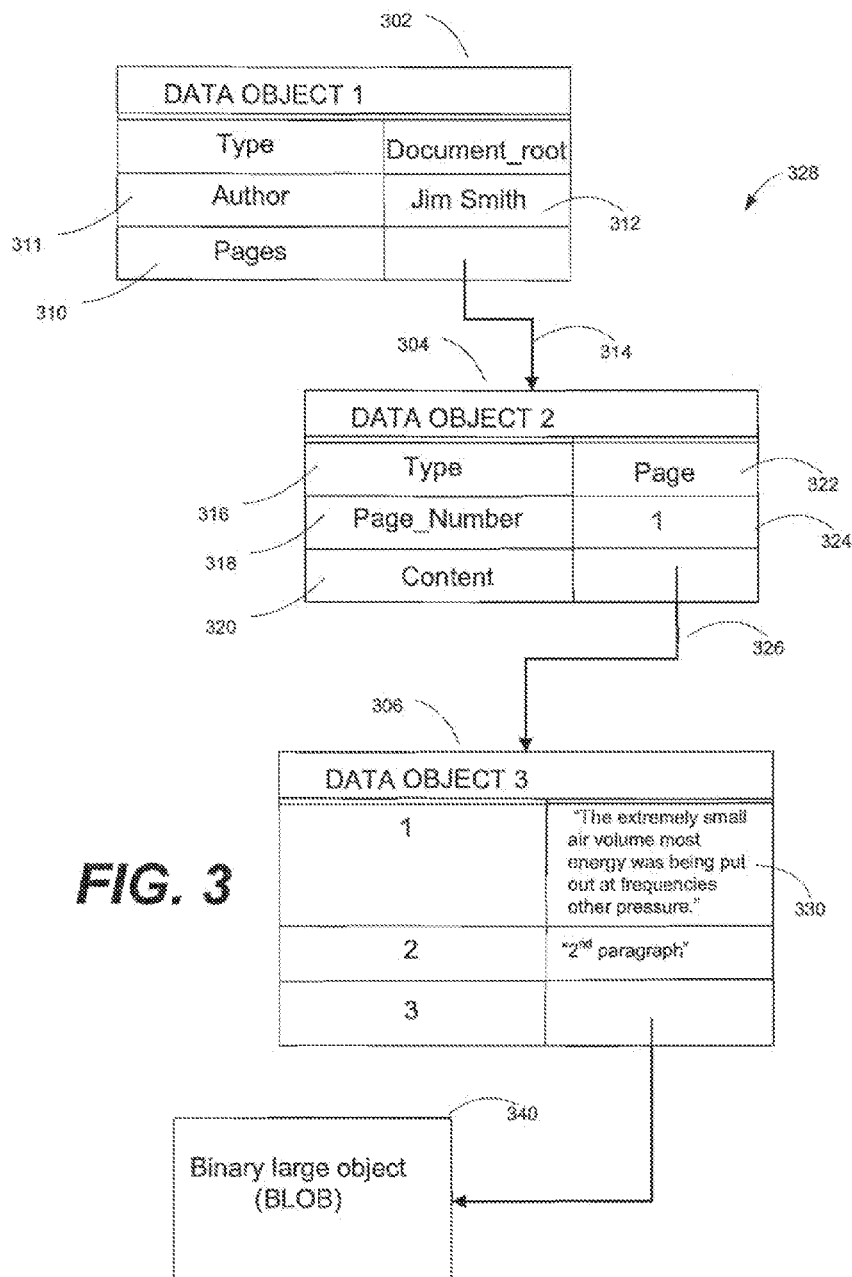
FIG. 3 illustrates an example of a simple electronic content in the form of an electronic document as it may be represented in an object-based data structure according to an example embodiment.

FIG. 3 illustrates an example of a simple electronic content in the form of an electronic document as it may be represented in an object-based data structure according to an example embodiment.

In FIG. 3, a data structure 328 including three data objects is illustrated. The data objects include a data object 302, which may be considered the top or root object of the data structure; a data object 304 which may represent a page of an electronic document and a data object 306 which may represent page content such as the paragraphs of a page of an electronic document. In the data object 302 it will be appreciated that three key/value pairs are illustrated. The first key/value pair defines the data object as being a document root type data object. The second key/value pair with a 311 (e.g., the string "Author") and a value 312 (e.g., the string "Jim Smith") the author of the document, is illustrated. The third key/value pair in data object 302 is identified by a key 310 (e.g., string "Pages") and a value, reference 314 to the data object 304 providing content describing, in this example, the single page of the electronic document.

The data object 304 includes three key/value pairs. The first key/value pair indicates the type of the data object 304 in which the key 316 ("Type") has the value 322 ("Page"). The second key/value pair in data object 304 indicated as key 318 ("Page_Number") and value 324 (1) expresses that this is page one of an electronic document represented by the data structure 328 and the third key/value pair key 320 and value 326, indicate the content of the page represented by data object 304. Data object 306 illustrates in the form of an array two paragraphs and a binary large object (BLOB) 340, such as, for example, a binary image byte stream, in the page represented by data object 304. The first paragraph is indicated as part 330.

Although the data objects 302, 304 and 306 all have three key/value pairs in the example data structure 328, in general the number of key/value pairs in each data object or in fact whether a particular data object includes key/value pairs or stores its content in some other organization, may depend on the particular electronic content being represented by the data structure.

In addition, in some embodiments more than one key/value pair may be present in which the value is a reference to another data object. In the context of FIG. 3, in processing the data structure 328, a recursive process for generating a textual representation of the content of the data structure 328 may begin by processing the root data object 302, recursively processing the data object 304, and recursively processing the data object 306. In the process of this recursive generation of the textual representation, the first data object 302 and second data object 304 may serve as the first data object and second data object for the purposes of the process 200 and later in the recursive processing the data object 302 and the data object 306 may be taken to be the first and second data object respectively within the context of process 200.

Accordingly, it will be appreciated that a process for generating a textual representation of a data structure (e.g., 300) may be carried out by iterating through the fields (e.g., key/value pairs) within a data object, selecting a suitable grammar rule item for each field, and recursively applying a process 200 to each field containing a non-scalar data that may be taken as the next lower level in the data structure.

Data object 304 may be, in some embodiments, considered a direct child of data object 302, and for example, data object 306 and data object 340 may be considered indirect children of data object 302.

Figure 4B:
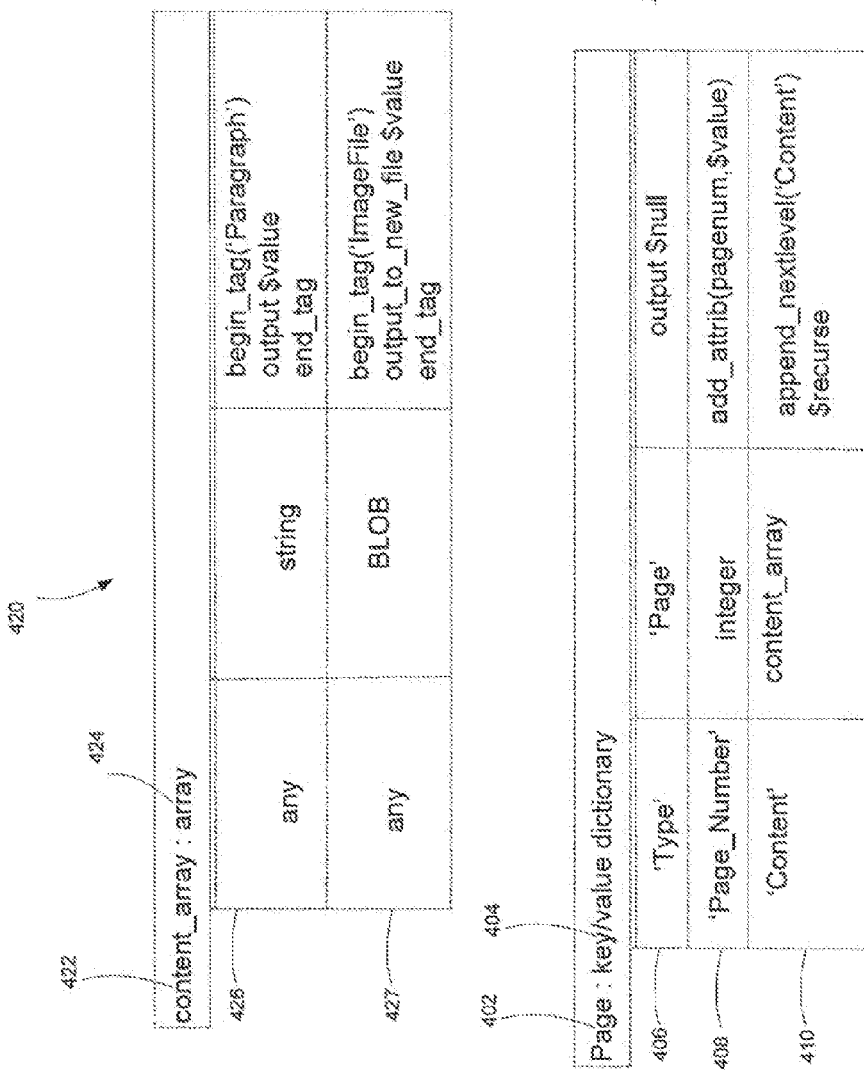

FIGS. 4A and 4B are block diagrams of example grammar rules that may be used in processing an electronic document stored in an object-based data structure, such as data structure 328, according to an example embodiment. The grammar rules, grammar rule 440 of FIG. 4A and grammar rule 420 and grammar rule 400 of FIG. 4B, illustrate grammar rules for processing a document root object, content array and a page data object, respectively.

Referring to FIG. 4A, the grammar rule 440 includes a number of components including a rule name 442, in this example "Document" as well as an object type 444 (e.g., "key/value dictionary"). The grammar rule 440 also includes three grammar rule items illustrated as horizontal rows 446, 448 and 450. The first column of the grammar rule set represents the key of a key/value pair that may be found in a page data object, in this example, these are literal strings but may in some embodiments be variables. The second column indicates the type of the value of the key/value pair in a key/value dictionary that corresponds to the grammar rule item and the third column provides an output control instruction allowing or facilitating the generation of a textual element corresponding to the key/value pair to which the grammar rule item corresponds.

For example, the grammar rule item 446 indicates that when a key/value pair is found in a document root data object, if the key is the literal string "Type" and the value is the literal string "Document", in fact no textual element need be generated for inclusion into the textual representation. The grammar rule item 448 indicates that if a key/value pair is found in a page data object whose key is the literal string "Author" and whose value is some string, this key/value pair may be taken to represent the author an electronic document that the page data object represents. Accordingly, a markup language tag pair named "Author" and surrounding the author's name associated with the 'Author' key, may be added, for example, to a markup language tag. Finally the grammar rule item 450 may pertain to a key/value pair in a page data object in which the key is the literal string "Pages" and the value is a reference to a data object describing a page of, for example, a page-descriptive document. This page-describing object may, in some embodiments, be directly included as a sub-object of the page-describing data object or in some other embodiments may be referenced by a inter-node link or reference included in the page data object. The output control instruction associated with this content key/value pair need not include appending anything to a textual representation but may indicate that processing is to recurse to the page-describing object using the 'Page' grammar rule 400.

Referring to FIG. 4B, the grammar rule 400 includes a number of components including a rule name 402, in this example 'Page' describing the type of this grammar rule (e.g., suitable for "Page" data objects), as well as an object type 404 (e.g., "key/value dictionary"). The grammar rule 400 also includes three grammar rule items illustrated as horizontal rows 406, 408 and 410. The first column of the grammar rule set represents the key of a key/value pair that may be found in a page data object, in this example, these are literal strings but may in some embodiments be variables. The second column indicates the type of the value of the key/value pair in a key/value dictionary that corresponds to the grammar rule item and the third column provides an output control instruction allowing or facilitating the generation of a textual element corresponding to the key/value pair to which the grammar rule item corresponds.

For example, the grammar rule item 406 indicates that when a key/value pair is found in a page data object, if the key is the literal string "Type" and the value is the literal string "Page", in fact no textual element need be generated for inclusion into the textual representation. In the case of the grammar rule item 408, the grammar rule item 408 indicates that if a key/value pair is found in a page data object whose key is the literal string "Page_Number" and whose value is some integer, this key/value pair may be taken to represent the page number of the page of an electronic document that the page data object represents. Accordingly, an attribute named "Page_Number" and having the value of the integer associated with the page number key, may be added, for example, to a markup language tag. Finally the grammar rule item 410 may pertain to a key/value pair in a page data object in which the key is the literal string "Content" and the value is a reference to a content array containing the content of the (e.g., a page-descriptive document's) page that the page data object represents. This content array may, in some embodiments, be directly included as a sub-object of the page data object or in some other embodiments may be referenced by an inter-node link or reference included in the page data object. In either case, the output control action associated with this content key/value pair may include appending a tag such as a markup language tag "<Content>" to the textual representation of the electronic document and recursively continuing the textual representation process by recursively processing the content array object.

Grammar rule 420 illustrates a grammar rule that may be used in the processing of an array of page content such as the paragraphs contained within a particular electronic document. The grammar rule 420 includes an indication of the name of the grammar rule ("content_array") to which it corresponds, in this case a content array, indicated at 422 and the type of the data object for which the grammar rule 420 pertains ("array"); for the purposes of this example is the general type of array. The example grammar rule 420 includes a grammar rule item 426. The first portion of the grammar rule item 426 may be an indication allowing grammar rule item 426 to match to any index of the content array type data object which is being applied during processing. The type of data found in the array, a string, is indicated by the second portion of the grammar rule item. The grammar rule item 426 also includes an output control instruction which, for the purposes of this example, adds a "<Paragraph>" markup language tag to the textual representation followed by the text of the array entry and followed by a closing markup language tag matching the opening paragraph markup language tag (e.g., "</Paragraph>").

The example grammar rule 420 also includes a grammar rule item 427. The first portion of the grammar rule item 427 may be an indication allowing grammar rule item 427 to match to any index of the content array type data object which is being applied during processing. The type of data found in the array, a binary large object (BLOB, e.g., an image), is indicated by the second portion of the grammar rule item. The grammar rule item 427 also includes an output control instruction which, for the purposes of this example, adds an "<ImageFile>" markup language tag to the textual representation followed by a (e.g., automatically generated) filename into which the BLOB data is written and followed by a closing markup language tag matching the opening paragraph markup language tag (e.g., "</ImageFile>"). In some embodiments, the "output_to_new_file $value" creates the file of having that filename in a filesystem and writes the bytes of the BLOB referenced by the reference in an array entry to that that file.

By processing a data structure (e.g., 328) made up of data objects in which each data object is of a type for which a grammar rule exists, it may be possible to produce a textual representation of an entire electronic context represented in the data structure.

Although both example grammar rules in FIGS. 4A and 4B include grammar rule items pertaining to data elements that are expected to be present in the types of objects to which they pertain, in some embodiments, one or more grammar rule items may pertain to data elements that are optional for the type of object to which a grammar rule pertains.

Grammar rule types may correspond to data object types. Some scalar, structured, and 'blob' (e.g., binary large objects) objects may have special actions (e.g., output control instructions) that depend on the type of object.

FIG. 4C is a block diagram illustrating nesting of grammar rules, according to an example embodiment. In FIG. 4C, a grammar rule 480 is illustrated. The example grammar rule 480 includes a number of grammar rule items, as well as a grammar rule inclusion indication 482. The grammar rule inclusion indication may facilitate the inclusion of grammar rule items from one grammar rule into another as if the included grammar rule items were a part of the grammar rule and to be treated as such during processing of data structures and/or textual representations as described below. For example, in some embodiments, one or more grammar rules may have an inclusion indication that a grammar rule 490 named "general_object_rule_items" (e.g., as indicated by the rule name 492) to facilitate the processing of various data objects and/or portions of textual representations of such data objects. This grammar rule 490 may, for example, provide output control instructions for object identifiers via grammar rule item 494, or for date stamps of when a particular data object was added to a data structure representing electronic content via grammar rule item 496. It will be appreciated that multiple grammar rules may be included within a grammar rule by this mechanism and may have nested inclusion.

The inclusion mechanism illustrated in FIG. 4C may be termed "composition of a grammar rule by inclusion". For example, in FIG. 4C, the grammar rule 480 may be considered to be composed by inclusion by the grammar rule 480 itself and grammar rule 490.

Figure 5:
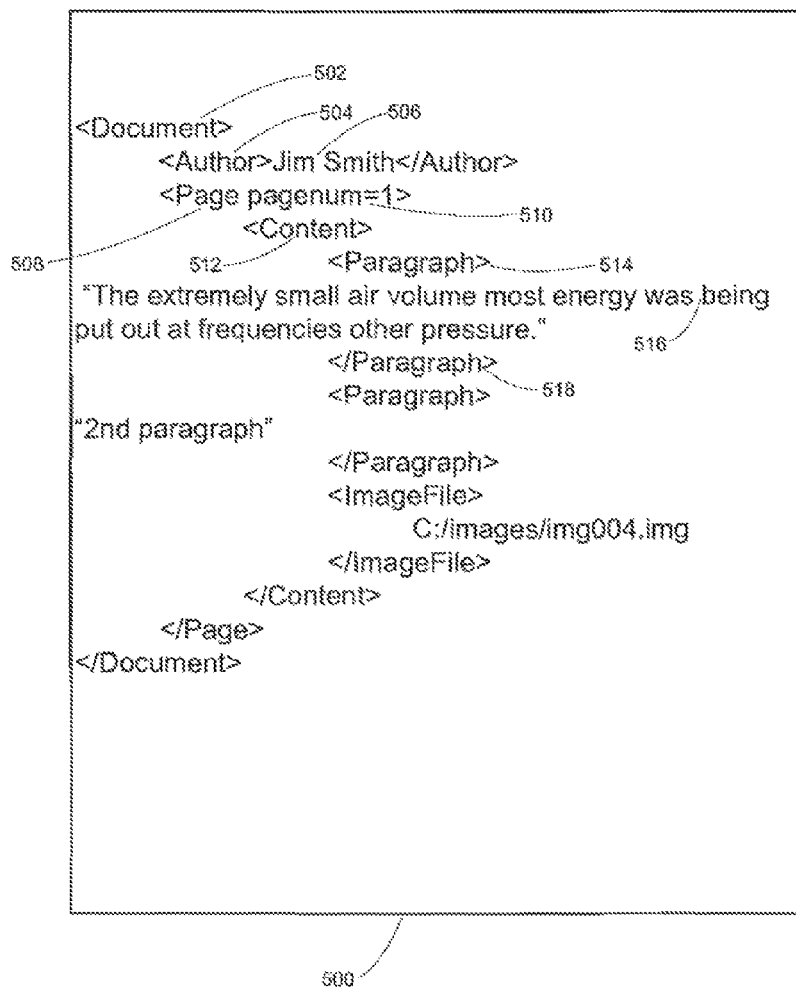
FIG. 5 illustrates an example of a textual representation in a markup language that may be generated by the use of the grammar rules illustrated in FIGS. 4A-4C from the example data structure of FIG. 3, according to an example embodiment.

FIG. 5 illustrates an example of a textual representation 500 in a markup language that may be generated by the use of the grammar rules illustrated in FIGS. 4A-4C from the example data structure 328 of FIG. 3, according to an example embodiment.

For the purposes of illustrating how the process 200 may be used in the generation of a textual representation of the electronic document illustrated as represented by the example data structure 328, a recursive process that begins with the root data object 302 is described. The process may begin by selecting a grammar rule based on the content of the data object 302, such as for example the "Document" value of the "Type" key/value pair. The grammar rule corresponding to the "Document" type data object 302 may generate the markup language tag "<Document>" 502 in textual representation 500. The "Author" key/value pair may be processed in accordance to the grammar rule and may result in the output of the "<Author>" opening markup language tag 504 and its associated closing markup language tag (e.g., "</Author>" with the author's name 506 generated between them. In markup languages (e.g., XML) in which textual elements are nested, an opening markup language tag (e.g., "<Paragraph>" 514) may be paired with a corresponding closing markup language tag (e.g., "</Paragraph>" 518), the paired tags located at the same level of containment within the textual nesting.

Next in the processing of data object 302 a key/value pair may be encountered in which the key is the string 301 ("Page") and the value is the reference to data object 304. By examining the content of the data object 302, which may be taken to be a first or parent data object with respect to process 200, a grammar rule pertaining to page type data objects, such as data object 304, may be selected. For example, the grammar rule 400 of FIG. 4B may be selected to process data object 304. Just prior to recursing to process data object 304, which may be considered the second or child object with respect to process 200, the process (for example in response to output control instructions associated with a grammar rule item of the grammar used in processing the root data object 302) may generate a "<Page" page markup language tag 508 into the textual representation 500.

Once a grammar rule, such as grammar rule 400, has been selected for processing the page data object 304, processing continues by processing the three key/value pairs within data object 304. Each key/value pair within data object 304 may be processed by selecting a matching grammar rule item, such as for example from grammar rule 400, and generating output to the textual representation 500. For example, the key 316 of the first key/value pair may match the first portion of the grammar rule item 406, with the second portion of grammar rule item 406 the string "Page" matching the value 322 of data object 304, thus activating carrying out the output control instructions in that grammar rule item. In the case of the first key/value pair of data object 304, no output is necessary.

Processing may continue in data object 304 with the page number 318 and the associated value 324 which in accordance with the grammar rule item 408 may cause the addition of the attribute "page_num=1" 510 to the textual representation 500. Finally the "Content" key 320 and the value 326 (e.g., the reference to the data object 306) may be processed using grammar rule item 410 which may include appending a "<Content>" tag 510 into the textual representation 500. At this point the processing of data object 304 may be considered essentially complete and processing may recursively continue to data object 306 with data object 306 in the role of the second data object and data object 304 in the role of the first data object in the process 200.

It will be appreciated that when the textual representation generated by the processing of the data structure (e.g., 328) is to have a hierarchical structure corresponding to the data structure (e.g., as by representation using XML) the processing of the data structure may need to be carried out in a depth-first manner to assure proper nesting of textual elements.

The data object 306 may be processed in a similar manner to the data object 304 using the grammar rule 420 to generate output describing the three components contained in the page represented by the page data object 304 into the textual representation 500. As a result of the output control instructions in grammar rule 420, each component in the data object 306 may be represented (or referenced) in representation 500. The two paragraphs may be represented with two "<Paragraph>" tag pairs with the paragraph text placed between them, such as, for example, as illustrated at textual elements 514, 516 and 518. The BLOB 340 may be written to a supplemental file, with a notation of that supplemental file's name enclosed within an "<ImageFile>" tag pair.

Once processing is completed with respect to data object 306, processing may return to data object 304 with the sending to the textual representation 500 the </Page> closing tag whose generation may be implicit in the "append_nextlevel" output control instruction in grammar rule item 401 and finally the completion of the processing of the root data object 302 with the generation of the "</Document>" tag at the end of the textual representation of the 500 of the data structure 328.

In the example process illustrated and described with respect to FIGS. 3 through 5, the process is discussed in which the order of content elements processed within the various data objects corresponds to the order in which textual elements corresponding to those data elements are generated and written into the textual representation. This need not be the case.

Figure 6:
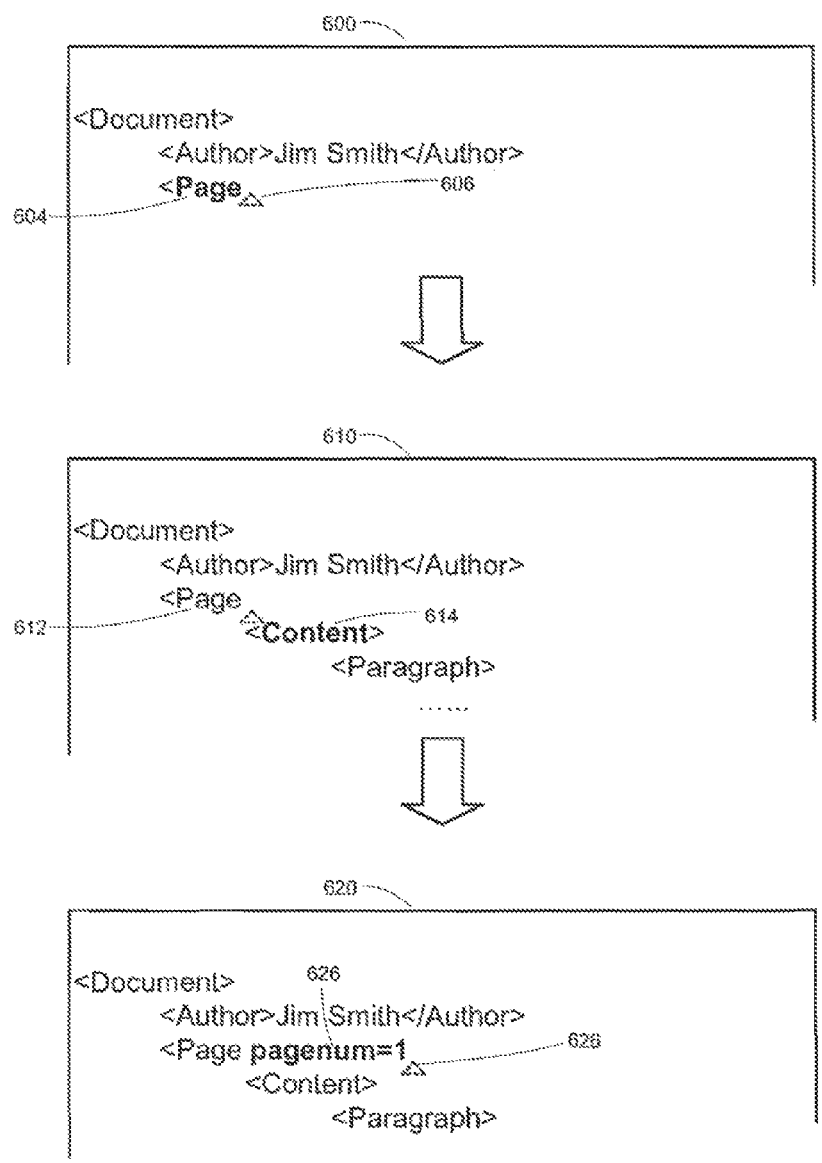
FIG. 6 illustrates an example of how the order in which textual elements appear in a textual representation of a data structure including data objects containing data elements may differ from the ordering of processing of their corresponding data elements in a data object, according to an example embodiment.

FIG. 6 illustrates an example of how the order in which textual elements appear in a textual representation of a data structure including data objects containing data elements may differ from the ordering of processing of their corresponding data elements in a data object, according to an example embodiment. For example, just before the processing of data object 304 facilitated by grammar rule 400, the "<Page" tag 604 may be generated and written into textual representation 600. In addition, a file pointer 606 or other insertion point (illustrated as a dashed triangle) may be maintained. Processing may then continue using grammar rule 400 at data object 304. In some embodiments the content key/value pair may be the first key/value pair processed within data object 304 and accordingly the content markup language tag 614 may be generated and written into the textual representation whose state is illustrated at 610 of FIG. 6. Subsequently, the page number key/value pair of data object 304 may be processed in accordance with grammar rule item 408. In this example, the attribute "page_num=1" 626 may be inserted at the location of the file pointer 606 stored in association with the most recent open markup language tag and the file pointer associated with the most recent markup language tag may be advanced in anticipation of the insertion of a further attribute to a new position indicated at 626 in the next state of the textual representation indicated as 602. Eventually, with the completion of the processing of the page data object 304 the closing bracket ">" of the opening "<Page" tag and the closing page tag may be inserted into the textual representation.

In some embodiments, this storage of the insertion point of the previous open tags may be facilitated through actual file insertion in a file. In some other embodiments, such as for example those in which the electronic content represented by the data structure such as data structure 328 is sufficiently small, the entire textual representation may be contained in memory in the form of a linked list of textual elements in which insertion of attributes and values into the textual representation may be facilitated through the use of pointers or other memory management technique to facilitate insertion of attribute data into the appropriate markup language tag while the textual representation is still stored in memory.

In some embodiments, when a grammar rule has been selected at block 204, the grammar rule may indicate that one or more pre-processing actions may be taken to output some preliminary textual elements to the textual representation before the main generation of the textual representation portion corresponding to the first data object. Similarly, in some embodiments, a grammar rule may indicate that one or more post-processing actions that may be taken to output some additional textual elements to the textual representation after the main generation of the textual representation portion corresponding to the first data object. Such pre-processing and post-processing actions may be termed rule-level since they may be associated with a grammar rule as a whole rather than a specific grammar rule item within the grammar rule.

Example Processes for Constructing a Data Structure Including Data Objects from a Textual Representation Using a Grammar In the previous section, example processes for creating a textual representation of electronic content stored in a data structure, including data objects, were presented. In the paragraphs that follow, processes using the same grammar rules but operating in the reverse direction are presented.

In overview, the process for constructing a data structure including data objects in memory from a textual representation may be a recursive process in which textual elements of the textual representation are used to select grammar rules, the grammar rules being used to facilitate or guide the construction of various data objects in the data structure.

When a textual element (e.g., an XML element, tag, attribute, etc) is encountered during parsing of a textual representation, it may be matched against the grammar as follows: A currently active grammar rule may be scanned (e.g., grammar rule item by grammar rule item) looking for a grammar rule whose (implicit or explicit) output control instructions matches the textual element as detailed below. When the matching grammar rule item is found, its parse action may be executed or a dictionary entry, array entry, or scalar value may be created based on the type of the rule the grammar rule item references. If the type of the grammar rule item is a primitive type, a scalar value (e.g., string, number, or other scalar) may be created based on the type of the rule the grammar rule item references. On the other hand, if the matching grammar rule item is of a non-scalar type (e.g., requires the creation of a new data object to be stored as a value within the currently being constructed data object), that rule may become (e.g., recursively) the new currently active grammar rule and further processing of the textual element and its semantically contained content may continue (e.g., in the populating of the new data object and its child objects). Finally, the value that results from the further parsing is added to the container as a dictionary entry, array element.

Figure 7A:
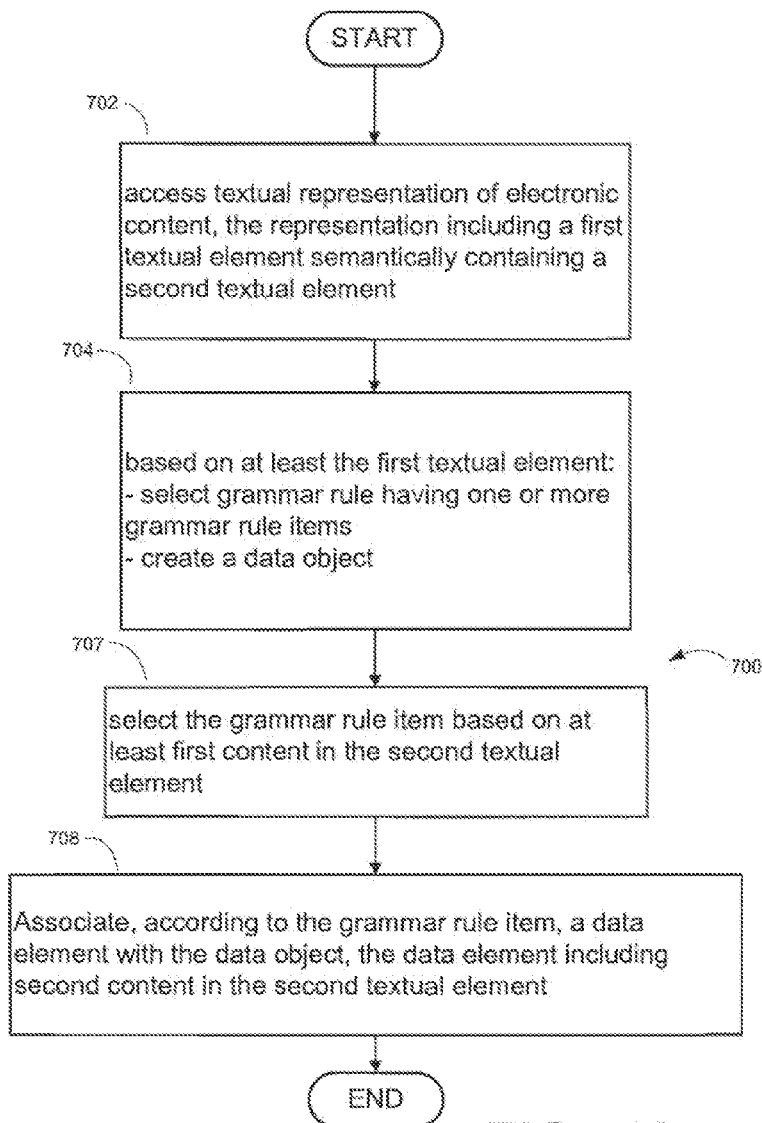
FIG. 7A is a flowchart illustrating an example process for constructing a data object and populating it according to a grammar rule with data from a textual representation, according to an example embodiment.

FIG. 7A is a flowchart illustrating an example process 700 for constructing a data object and populating it according to a grammar rule with data from a textual representation, according to an example embodiment. Process 700 may, in some embodiments, be carried out by a textual representation parsing module 106. At block 702 a textual representation of an electronic content may be accessed in which the representation includes a first textual element semantically containing a second textual element. A first textual element may semantically contain a second textual element when, for example, the textual representation is arranged in a hierarchical manner where a first textual element is superordinate to a second textual element. At block 704 the first textual element may be examined and based on the content of that first textual element, a grammar rule having a type corresponding to that first textual element, may be selected where the grammar rule has one or more grammar rule items and each grammar rule item has a type of its own. Thereafter, in block 704, a data object may be created having the first type, that is the type of the grammar rule selected based on the content of the first textual element. For example, a data object may be created being of a type compatible with a data type mentioned within the content of the first textual element. At block 707 a grammar rule item included in the selected grammar may be selected based on the content of the second textual element such as, for example, the type of the second textual element. Finally, at block 708 a data element of the second type (which may be the type associated with the selected grammar rule item) may be created and associated with the data object that was created in block 704. The data element includes content semantically contained in the second textual element. It will be appreciated that the process 700 may be used multiple times in the construction of the data structure from the textual representation. Finally, at block 708, a data element may be associated with the data object, in accordance with the grammar rule item, the data element including second content in (e.g., semantically contained within) the second textual element.

Figure 7B:
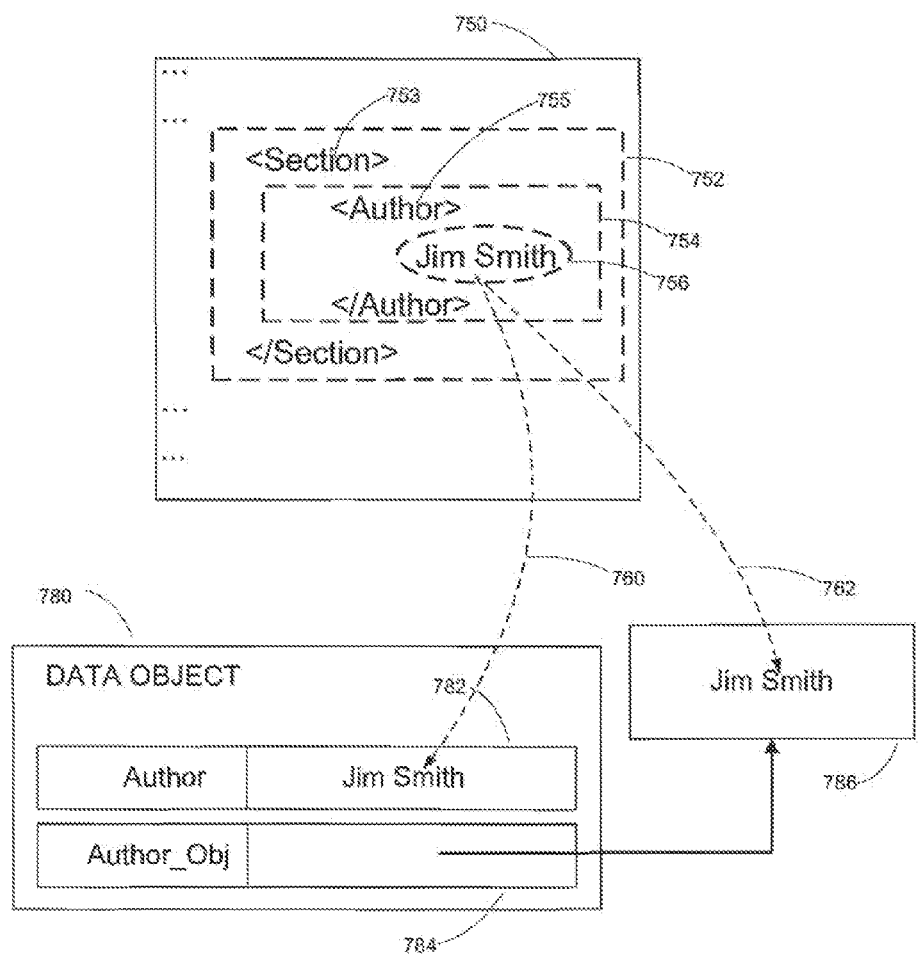
FIG. 7B illustrates, using an example fragment of a textual representation, the process of FIG. 7A, according to an example embodiment.

FIG. 7B illustrates, using an example fragment of a textual representation 750, the process 700, according to an example embodiment. In FIG. 7B, A first textual element 752 (e.g., including a "Section" tag 753) may semantically contain or otherwise include a second textual element 754 (e.g., including, as first content in the sense of process 700, the "Author" section tag 755). The "Section" tag 753 and its closing tag may define the first textual element 752. The "Author" tag 755 may define the second textual element 754. In turn, a second content (e.g., author name "Jim Smith" 756, as second content in the sense of process 700) may be included within the second textual element 754.

At block 704, a textual representation parsing module may select a grammar rule based on encountering the "Section" tag 753, and accordingly create a data object 780. At block 707, a grammar rule item may be selected based on the "Author" tag 755. The grammar rule item may specify whether, for example, a data element containing the author data for a section is to be associated to the object in a key value/pair 782 or, alternatively, stored in a separate object 786 (e.g., by recursion to create data object 786 that may be referenced by the data object 780, e.g., by a reference within a key/value pair 784. Finally, at block 708, a data object (e.g., key/value pair 782 or data object 786) may be associated with the data object 780. The inclusion of the second content (e.g., "Jim Smith") may be illustrated by data movement lines 790 or 792, depending on the association of the data element with the data object 780.

In some embodiments the first content and the second content may in fact be the same piece of content within the textual representation.

The process 700 may be carried out by the textual representation parsing module 106.

Depending on the particular grammar rule item selected in block 707, the selection may be based on determining whether the first content in the textual representation is generable or could have been generated according to output control instructions in the grammar rule item. These output control instructions may be explicitly included in the grammar rule item as illustrated in the example grammar rules 400 and 420 in FIG. 4B or may be implicit in the grammar rule item. The data element associated in block 708 with the data object may be a second data object, or a reference to a second data object, a scalar data element, such as for example a string or integer, or a compound data element, such as a second data element included within the first data element. In some embodiments, a grammar rule item may be selected based on the first content from the textual representation matching an identifier such as an object type within the grammar rule item.

In some embodiments, a grammar rule item may include both output control instructions and textual representation parsing instructions. This inclusion of both types of instructions may facilitate processing (e.g., of data structures and textual representations) when, for example, a representation of a portion of electronic content differs enough between its representation within a data object and its textual representation that bi-directionally interpretable output control instructions may not be sufficient to handle both directions of processing.

It will be appreciated that when a current grammar rule (e.g., as selected at block 204 and/or 704) is composed by inclusion, the selection of a grammar rule item in block 208 and/or block 707 may be carried out by examination of the various nested and/or multiple grammar rules composed by inclusion with the current grammar rule.

Figure 8:
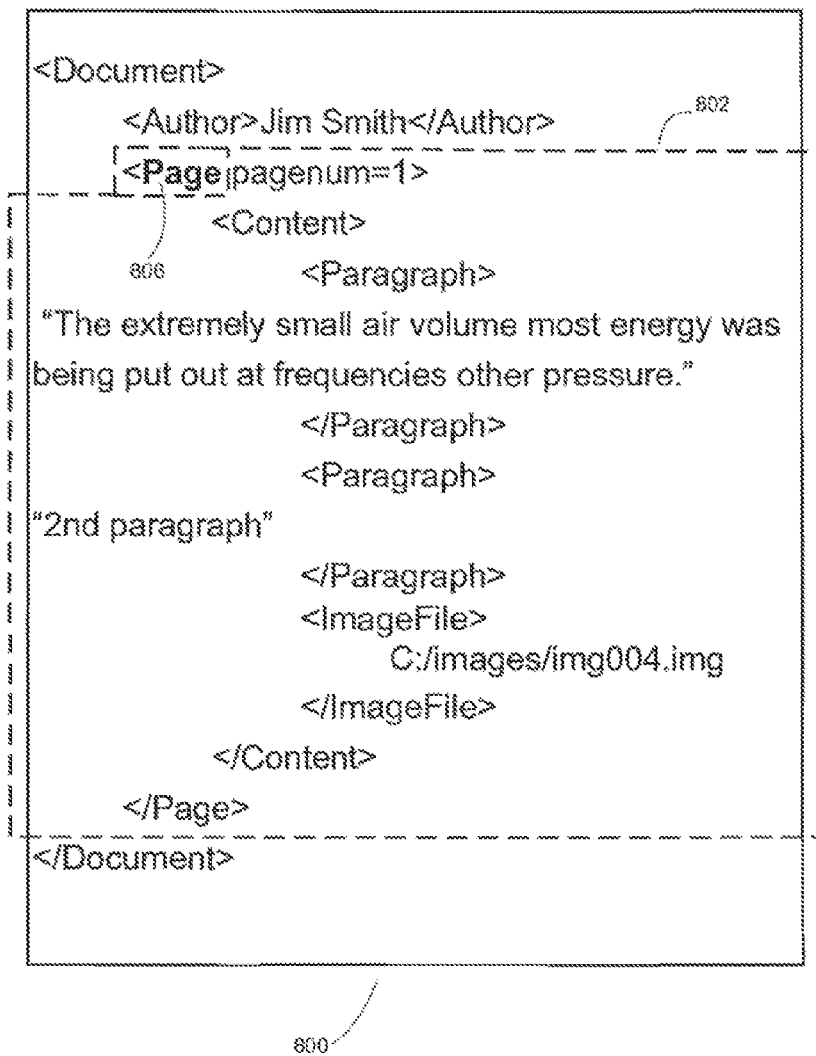
FIG. 8 is an example representation illustrating a textual representation of electronic content replicating the textual representation shown in FIG. 5.

FIGS. 8 through 14 illustrate a process for constructing a data structure from a textual representation through the use of process 700, according to an example embodiment. FIG. 8 is an example representation illustrating a textual representation 800 of electronic content replicating the textual representation 500 of FIG. 5. The textual representation 800 is used in FIGS. 9-14 to illustrate a process of constructing data objects, according to an example embodiment. In FIG. 8, a first textual element (e.g., the "<Page" tag 806) within the textual representation is indicated by a dashed rectangle. The dashed shape 802 surrounds the portion of the content of the textual representation that may be considered to be semantically contained in the first textual element, e.g., those textual elements that are semantically contain in the "<Page" textual element. For example the page num equals one string with the content tag. It will be appreciated that the content "page-num=1" may be considered content semantically contained in the first textual element. The "<Page . . . >" tag may be said to be located within the next containment level below the "<Document>" tag.

Figure 9:
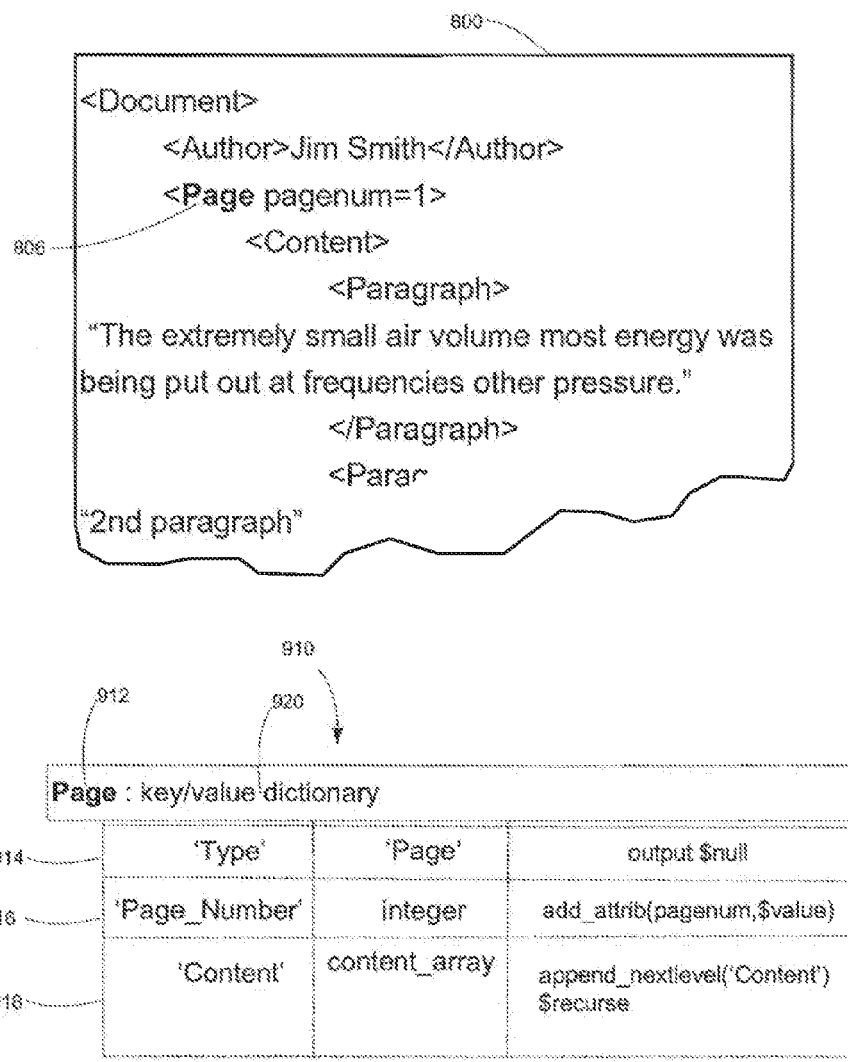
FIG. 9 illustrates the selection of a grammar rule based on the content of a textual element, according to an example embodiment.

FIG. 9 illustrates the selection of a grammar rule of a first type that includes one or more grammar rule items based on the content of the first textual element as described in block 704 of process 700, according to an example embodiment. In processing the textual representation, a piece of content, for example the tag word "Page" 806 in textual representation 800, may be accessed. The first textual element is in this example the page tag ("<Page . . . >") including the "page-num=1" attribute. A grammar rule 910 may be selected based on this content, such as for example by having a type 912 matching the tag word 806. This grammar rule 910 may include grammar rule items 914, 916 and 918.

For purposes of example, it may be assumed that the processing illustrated by FIG. 9 takes place in the context of having already created a document root data object using e.g., grammar rule 420, with the <Document> and <Author> tags having already been processed and the "<Page . . ." tag having been encountered and used to select grammar rule item 450, with grammar rule item 450 in turn indicating the grammar rule 910 is to be selected.

In FIG. 9, grammar rule 910 may specify the object type that is to be constructed at block 704 in the processing of a textual representation. For example, grammar rule 910 may include an object type 920 specifying that a key/value dictionary object is to be created when, for example, a "<Page>" tag is encountered in the processing of a textual representation such as 800. The grammar rule item 450 may indicate that this newly created key/value dictionary is to be attached to the document root object.

Figure 10:
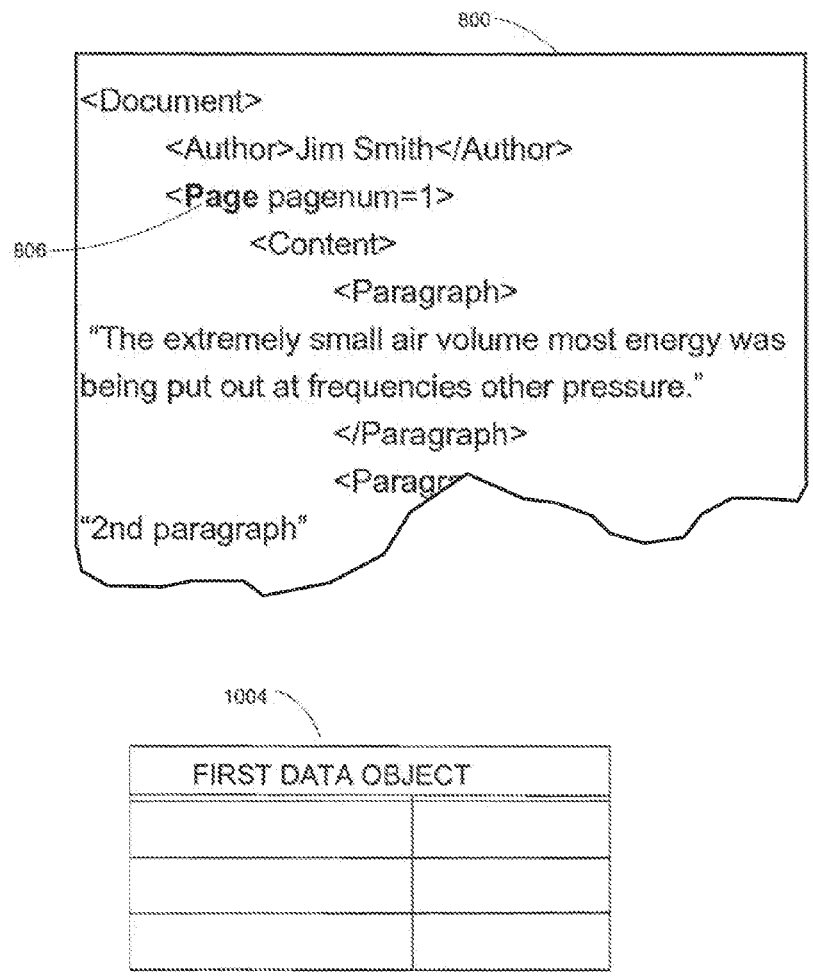
FIG. 10 illustrates a further operation in the process of constructing a data structure representing electronic content from a textual representation of the electronic content using a grammar, according to an example embodiment.

FIG. 10 illustrates a further operation in the process of constructing a data structure representing electronic content from a textual representation of the electronic content using a grammar, according to an example embodiment.

In FIG. 10, a first data object 1004 (e.g., a page-describing data object, that may possibly be attached already to a document root data object) is illustrated as having been created in response to encountering the tag word "Page" 806. The first data object 1004 may be created to be suitable to the type of the selected grammar rule 910, in this example as a key/value dictionary type data object. The first data object 1004 may be attached by a reference to a parent data object; in some embodiments the first data object 1004 may be linked to a parent data object after it has been fully populated.

Figure 11:
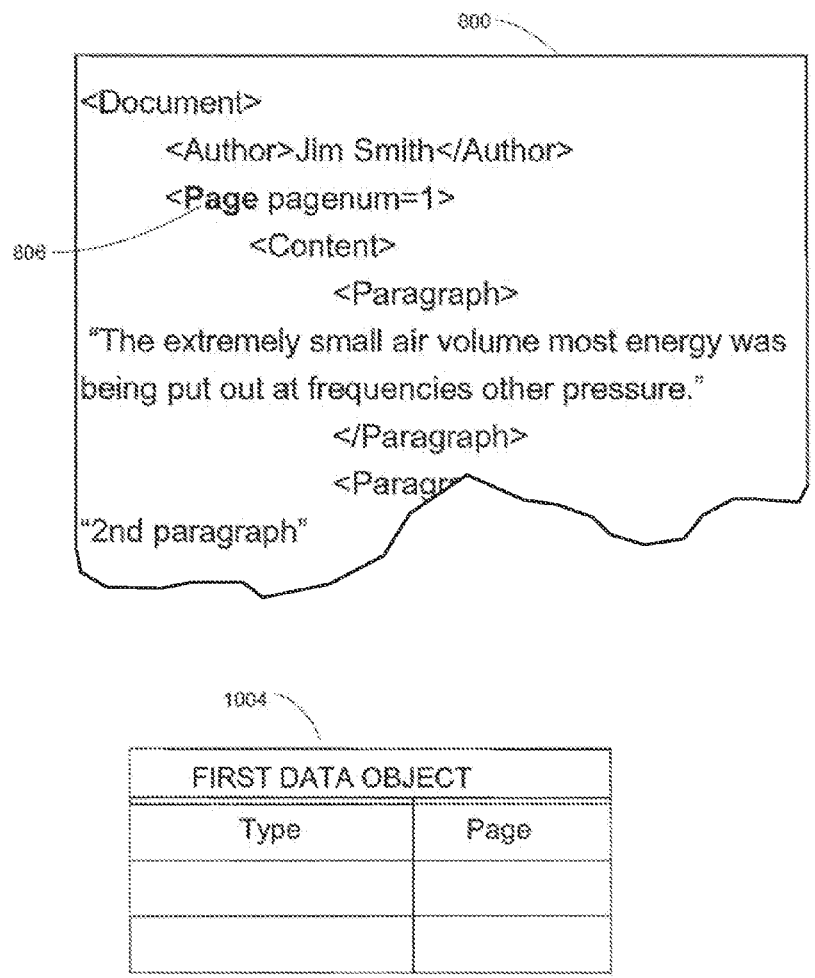
FIG. 11 illustrates an initial operation in populating the newly created data object with data elements whose content is from the textual representation, according to an example embodiment.

FIG. 11 illustrates an initial operation in populating the newly created data object with data elements whose content is from the textual representation 800, according to an example embodiment.

As mentioned above, in the processing of the textual representation 800, in some embodiments the first operation, once an applicable grammar rule has been selected and the data object 1004 created, is the population of the data object 1004 with key/value pairs that are appropriate to the object, but which are not represented by content elements within the textual representation 800. For example, grammar rule 910 includes the grammar rule item 914 that, when used in a process of generating a textual representation of electronic content from a data structure representing the electronic content, indicates that while the data object may contain a key/value pair "Type", "Page", no corresponding textual element is generated and written into the textual representation. Conversely, when, in the course of constructing a data structure from a textual representation, and specifically, in this example, a page data object, the presence of such null outputting grammar rule items may indicate that a data object is to be populated (e.g., data object 1004) with the appropriate key/value pairs. Accordingly, in the process of constructing the page data object, the grammar rule may be examined for grammar rule items that do not generate textual representations and associating data elements such as corresponding key/value pairs with the data object.

Figure 12:
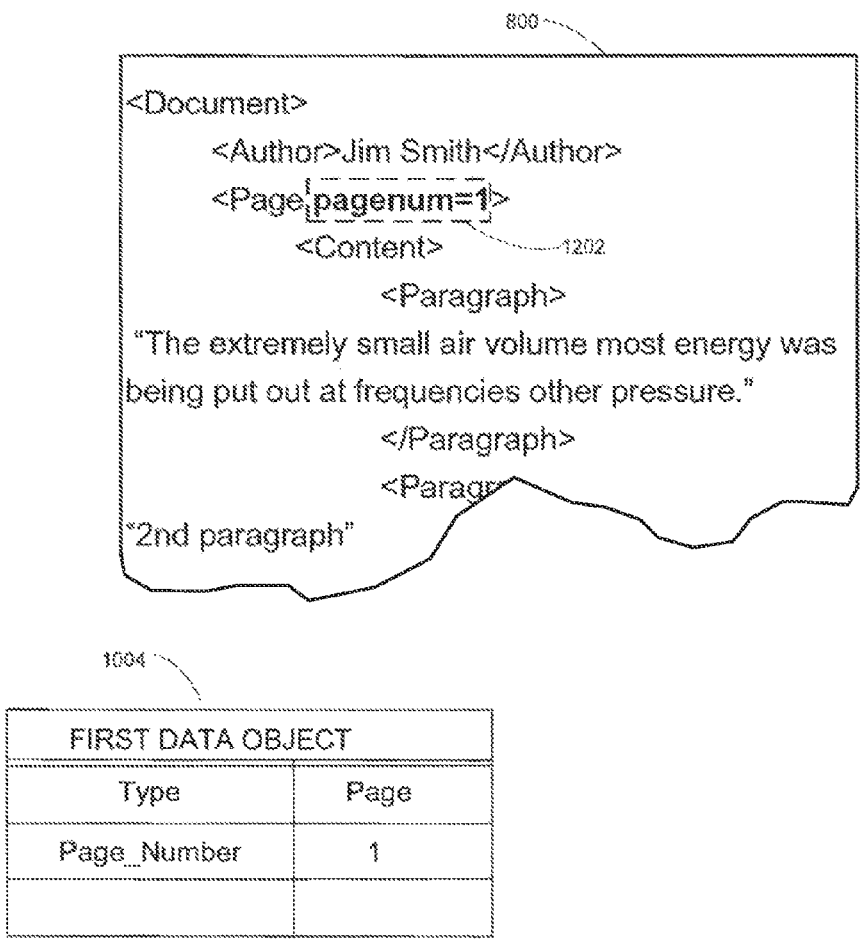
FIG. 12 illustrates, using the example textual representation of FIG. 8, the processes of block 707 and 708 of FIG. 7, according to an example embodiment.

FIG. 12 illustrates, using the example textual representation 800, the processes of block 707 and 708, according to an example embodiment. In FIG. 12, the grammar rule 910 having been selected and the data object 1004 having been created, the processing of the textual representation may continue with the processing of the second textual element indicated by box 1202. By examining this textual element, a grammar rule item may be selected from the grammar rule 910 of FIG. 9. A selection of the grammar rule item may be made in various ways. In some embodiments, the grammar rule item may be selected by examining a second textual element and determining which output control instruction may have generated that textual element.

In FIG. 12, the textual element "pagenum=1" (e.g., in its role as a second textual element in the sense of process 700) may be used to select grammar rule item 916 and thus according to the grammar rule item 916, the data element such as for example the key/value pair "Page_Number", "1" may be associated with the data object 1004. In some embodiments, the selection of the grammar rule item may be based on the first content (e.g., "pagenum") in the second textual element and the data element associated with the data object may include second content ("1") in the second textual element. The first and second contents may in fact be the same string or different or overlapping strings depending on the particular application of process 700.

Figure 13:
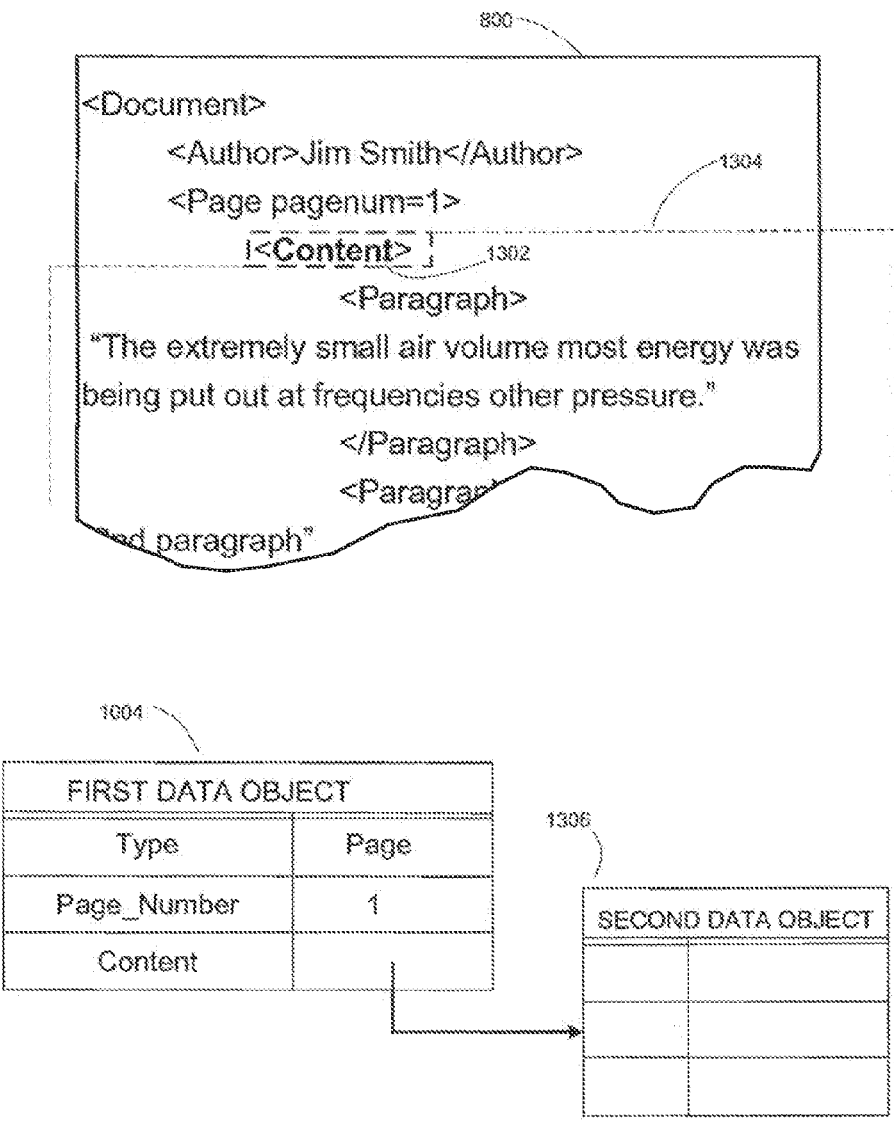
FIG. 13 illustrates a further operation in the process of constructing a data object based on a grammar rule and a textual representation of electronic content, according to an example embodiment.

FIG. 13 illustrates a further operation in the process of constructing a data object based on a grammar rule and a textual representation of electronic content, according to an example embodiment. In FIG. 13, processing of the textual representation is shown as advanced to the processing of the textual element "<Content>" 1302. The portion of the textual representation semantically contained in the textual element "<Content>" is illustrated as contained within shape 1304. Based on this textual element, the grammar rule item 918 may be selected where the tag word "Content" may be itself taken to be the first content used to select the grammar rule item 918. In response to the selection of the grammar rule item 918, a second data object 1306 (e.g., a content array type data object) may be created and may be attached to the first data object 1004 by associating with data object 1004 a key/value pair whose key is "Content" and whose value is a reference (e.g., a pointer or inter-node link) to the second data object 1306. In accordance with grammar rule item 918, the construction of the data structure may continue recursively with the second data object 1306, by carrying out process 700 with respect to data object 1306.

Figure 14:
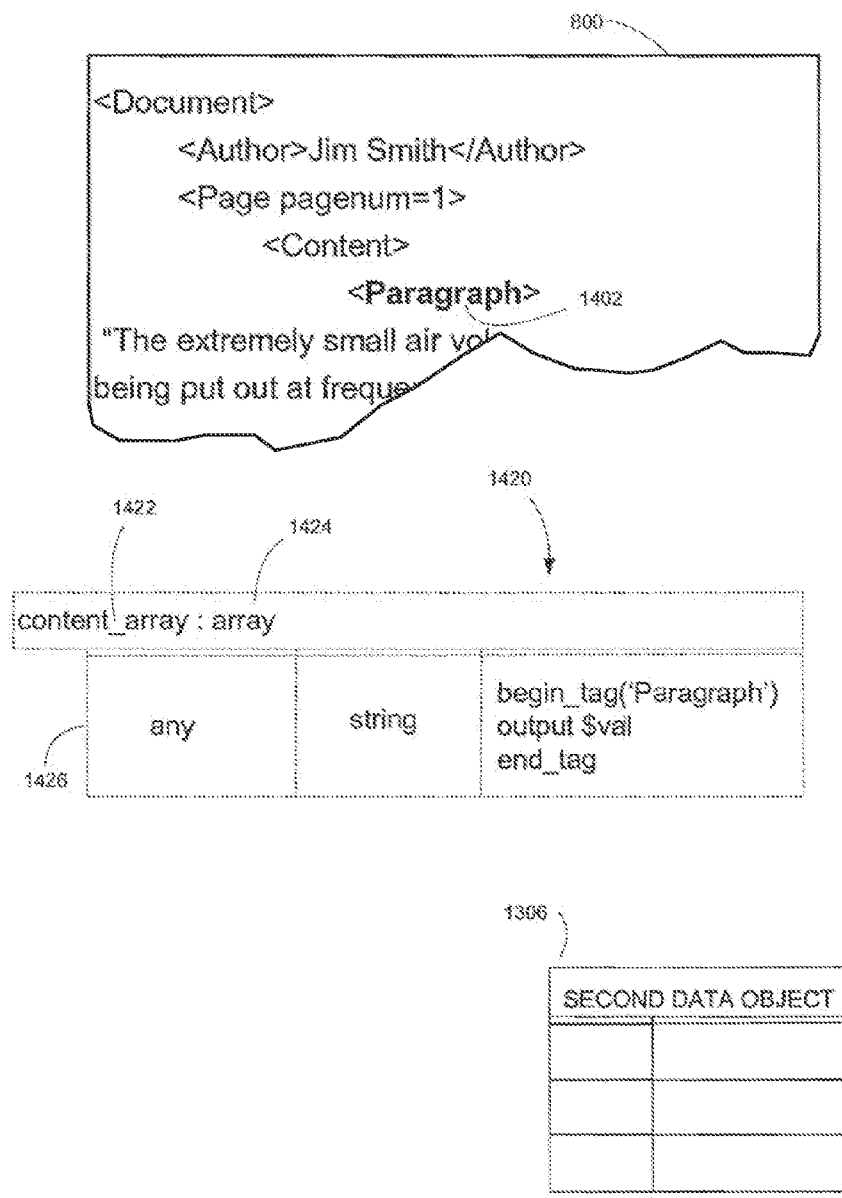
FIG. 14 illustrates a selection of a grammar rule and a selection of the grammar rule item within the grammar rule for a data object, based on a portion of a textual representation of electronic content, according to an example embodiment.

FIG. 14 illustrates a selection of a grammar rule 1420 and a selection of the grammar rule item 1426 within the grammar rule 1420 for a data object 1306, based on a portion of the textual representation 800 of electronic content, according to an example embodiment.

The grammar rule 1420 may be selected based on the content of the first textual element, in this example, the content tag 1302. The selection of the grammar rule 1420 may be further based on the context that the enclosing processing, in a recursive sense, is using the grammar rule 918. For example, it will be observed that the type 1422 (e.g. content array) associated with grammar rule 1420 is the type indicated within grammar rule item 918.

The data object 1306 may subsequently be populated, as an array, by the content of the "<Paragraph>" textual elements, such as textual element 1402 by matching these textual elements with the output control instructions of grammar rule item 1426. Eventually, the data object 1306 may be fully populated, as indicated by the processing of the textual representation 800 encountering the closing "</Content>" tag, and thus exiting the recursive operation for constructing data object 1306, and eventually exiting the recursive operation for constructing data object 1004 (e.g., in response to encountering the closing "</Page>" tag.)

Example Processing of XML-Formatted Textual Representations

As described above, in some embodiments, textual representations of electronic content may be implemented in Extensible Markup Language (XML). When an textual element (e.g., an XML element or attribute) is encountered during parsing of an XML textual representation, it may be matched against a grammar as follows: The current grammar rule may be scanned (e.g., grammar rule item by grammar rule item) looking for a grammar rule item that matches as detailed according to the example matching rules below. When a matching grammar rule item is found, textual representation parsing instructions (that may be present in the grammar rule item, or derived from explicit or implicit output control instructions) associated with the matching grammar rule item may be executed (e.g., to extract second content of block 708 from the textual representation) and/or a dictionary (e.g. key/value pair) entry, array entry, or scalar value may be created based on the type of the grammar rule that the grammar rule item references. A value from the XML element or attribute may be then further parsed based on the rule that the matching item references. At the conclusion of the processing of any grammar rule (with the exception of a grammar rule for creating a top or root object of a data structure), the data object created (e.g., at block 704) should be returned back up the recursion stack so that it may be associated to a parent data object 9 e.g., such as by having a reference to the newly created object included within a key/value pair within its parent data object.

In some embodiments, once a grammar rule ha been selected (e.g., at block 704), the selection of the appropriate grammar rule item within that grammar rule may include examining a markup language tag, element, or attribute of a particular name, and determining which output control instructions were used to originally write out a markup language tag, element, or attribute having that name. In some embodiments, grammar rule items in additional rules may also be examined, such as, for example, when the grammar rule selected is composed by inclusion with other grammar rules, or when grammar rule items have purely recursive output control instructions, as described below.

Example Textual Element Generation/Parsing Processing

In some embodiments, a data structure 116 may include a data object that includes unstructured data such as a binary stream (e.g., a binary string of bytes representing some data such as an image or sound).

Figure 15:
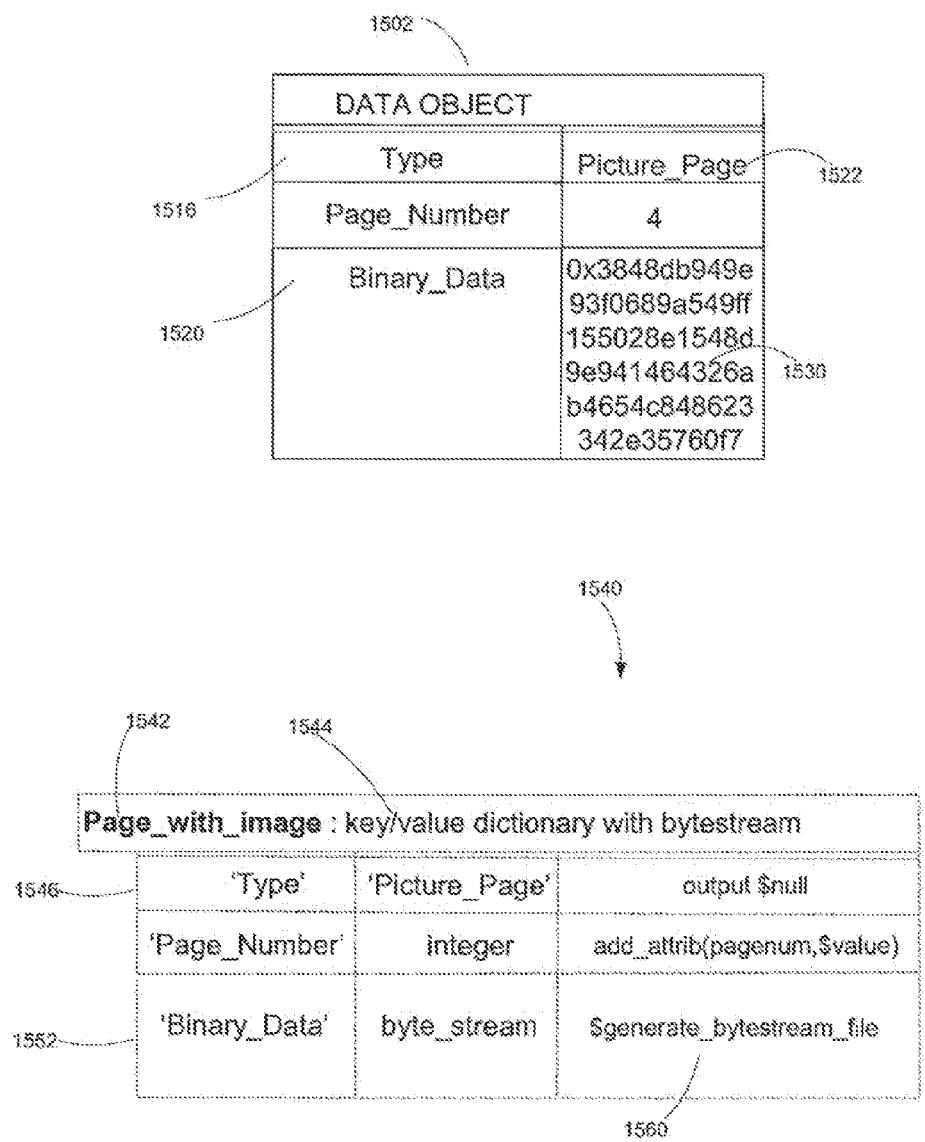
FIG. 15 illustrates an example of a page object that includes a picture page object, according to an example embodiment.

FIG. 15 illustrates an example of a page object that includes a picture page object 1502, according to an example embodiment. It will be appreciated that picture page object 1502 includes a key/value pair with a key 1520 ('Binary_Data') and a value representing stream 1530 of binary bytes. A diagrammatic illustration of a grammar rule 1540 that may be used in processing such a page object with an image is also shown in FIG. 15.

In some embodiments, when processing a data object such as the picture page object 1502 to generate a textual representation, a grammar rule item 1552 may be selected in response to the presence of a binary byte stream 1530. In that situation, a system may include an output control instruction 1560 to generate a separate output file for storing the (possibly large) binary byte stream as well as inserting a textual element into a textual representation referencing the file. An example of such output is illustrated in example FIG. 16.

FIG. 16 illustrates a portion of a textual representation 1602 (such as a file trfile.xml) as it may be generated using the grammar rule 1540, as well as an auxiliary file 1604 that may contain the binary stream data per se, according to an example embodiment.

In processing a textual representation, the textual element generated by the output control instruction 1560 may be recognized and used to load a binary representation, create a suitable data element in (or associated with) the constructed data object, and insert the binary data from the indicated file into the data element.

In some embodiments, a data structure 116 to be processed to generate a textual representation of the electronic content contained in it may not be a tree structure but may include loops or multiply-parented data objects that, if it were traversed in an ordinary tree traversal process would cause the processing of the same data object more than once. The designer of the grammar may decide how repeated encounters with a particular data object in the process of parsing a data structure is to be handled. For example, multiple copies of the textual representation of the repeatedly-encountered data object are to be generated into a textual representation of the data structure. In some embodiments, a particular encounter of the repeatedly-encountered data object may be selected for generation of corresponding textual elements, with other encounters eliciting the generation of references to the corresponding textual elements.

Figure 17:
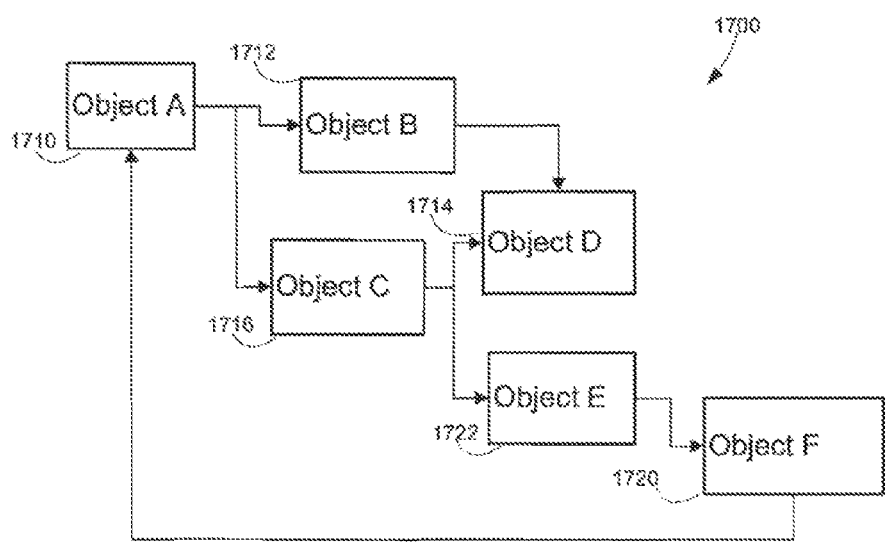
FIG. 17 illustrates a non-tree arrangement of data objects, according to an example embodiment.

FIG. 17 illustrates a non-tree arrangement of data objects, according to an example embodiment. These data objects are included in a data structure 1700 and may be designated with letter identifiers: Object A 1710, Object B 1712, Object C 1716, Object D 1714, Object E 1722, and Object F 1720.

In order to generate a corresponding textual representation of data structure 1700, a record of the data objects that have been processed may be stored for example in the memory 111 by the data structure parsing module 108. The first time a particular data object is processed in the generation of a textual representation, the full generation of the textual representation of the data object's data elements may be carried out. If the particular data object is encountered again later in the textual representation generation process, only a reference textual element may be generated into the textual representation.

For example, in some embodiments, the generation of the portion of the textual representation of the electronic content described with respect to block 210 may be dependent on whether a textual element representing the second data has already been generated into the textual representation. For example, data objects that have been processed may be stored in a "has been generated for" set or otherwise marked. Accordingly, the first time a particular data object is encountered in the role of the second data object in the sense of block 210 (e.g., is not already in the "has been generated for" set), it may be marked or otherwise included in a "has been generated for" set, and processed to generate a corresponding textual element. On the other hand, if that same data object is again encountered in processing the data structure and is determined to be in the "has been generated for" set, rather than generating another copy of the data object's corresponding textual element into the textual representation, a reference 1806 to the data object's identity (e.g., an identifier) may be emitted into the textual representation. If the data object does not already have an identity, a new identity may be assigned to it, with that identity inserted into the previously generated corresponding textual element. This insertion may be done using similar mechanisms to those described with respect to FIG. 6.

FIG. 18 illustrates an example of a textual representation 1800 of the data structure 1700, according to an example embodiment. In FIG. 18, it will be appreciated that a textual representation of Object D is found in the representation 1800 initially in the context of being a child of Object B as represented by textual elements 1802 and 1804, and later as a reference textual element 1806 in the context of the children of Object C.

In constructing a data structure from a textual representation, a textual representation parsing module 106 for example, may be programmed so as to allow either an actual recursively constructed data object or an already existing data object referenced by a reference textual element to be associated with a parent data object. For example, the first time a textual element representing a data object that includes an identity is processed by the textual representation parsing module 106, the identity may be stored in an "already constructed" list providing links to already-constructed data objects or other data elements. Later encounters with a reference textual element referencing that identity may cause the textual representation parsing module 106 to look up the identity in the 'already constructed" list and attach the corresponding earlier-constructed data object to the data object being constructed.

In some embodiments, handling of multiple parenting and/or back pointers among data objects may be processed depending on the context, with some grammar rules specifying that certain repeatedly visited child objects are to be recursively processed, while certain other repeatedly visited child objects are to be represented in a textual representation with reference to the textual elements representing the first occurrence.

In some embodiments, grammar rules may be designed to prevent the data structure parsing module 108 from becoming caught in an "infinite" recursion when a data structure (e.g., 116) includes a loop. Object A 1710, Object B 1716, Object E 1722, and Object F 1720 illustrate an example of such a loop. Such grammar rules may include provisions for not following references to other data objects in, for example, key/value pairs where that reference is known to be part of a loop. For example, a grammar rule item may include an output control instruction indicating that an annotative textual element is to be generated into a textual representation indicating how the data object being processed is to be connected to further data object to form a loop rather than attempting to follow a reference and process the further data object to generate corresponding textual element(s) for the further data object. For example, in processing Object F 1720, a grammar rule item may include an output control instruction describing a textual element to be annotated to the textual representation of the data structure including a reference to a (possibly already processed) Object A 1702 and/or sufficient information to allow reconstruction of the looped structure by the textual representation parsing module 106.

An example of a situation in which a loop occurs in when a data structure includes a two-way linked list. In this situation, since every pair of data objects form a loop, only the forward pointers may need to be followed in processing. Accordingly, grammar rules used to process two-way linked lists may need to have particular grammar rule items that omit recursively following back-pointing references to data objects and may include special directives to recreate the back pointers when a textual representation describing such a list is processed.

In some embodiments, back pointers to ancestor data objects may be omitted from a textual representation. A back pointer may need to be regenerated, with a grammar rule for the descendent object providing a special output control instruction that results in generation of no textual element representing the back pointer but does provide an indication that the reconstruction of the back pointer to a particular previously-constructed data object is to occur in processing a textual representation.

Example Handling of Extensions to Grammar-Defined Data Structures

In some embodiments, it may be possible for users of data structures to add additional content and specialized data objects within a data structure beyond those described by a particular grammar. In order to successfully process such data structures augmented by $3^{rd}$-party extensions, a grammar may include special grammar rule items and/or output control instructions for handling unrecognized data objects within data structures and/or textual representations.

Examples of Processing Using Purely Recursive Output Control Instructions

Figure 19:
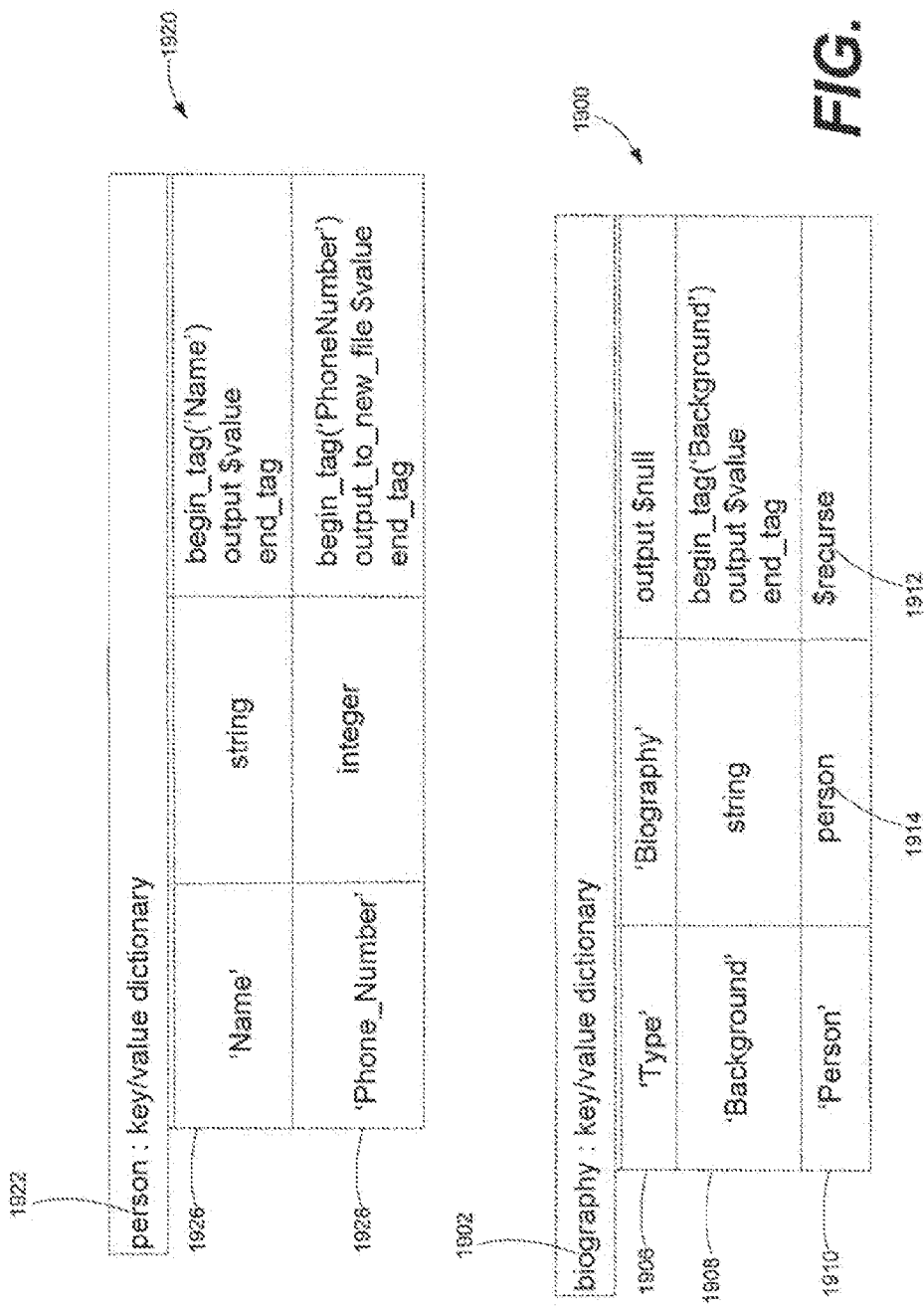
FIG. 19 illustrates a pair of grammar rules in which a purely recursive output control instruction is illustrated, according to an example embodiment.
Figure 20:
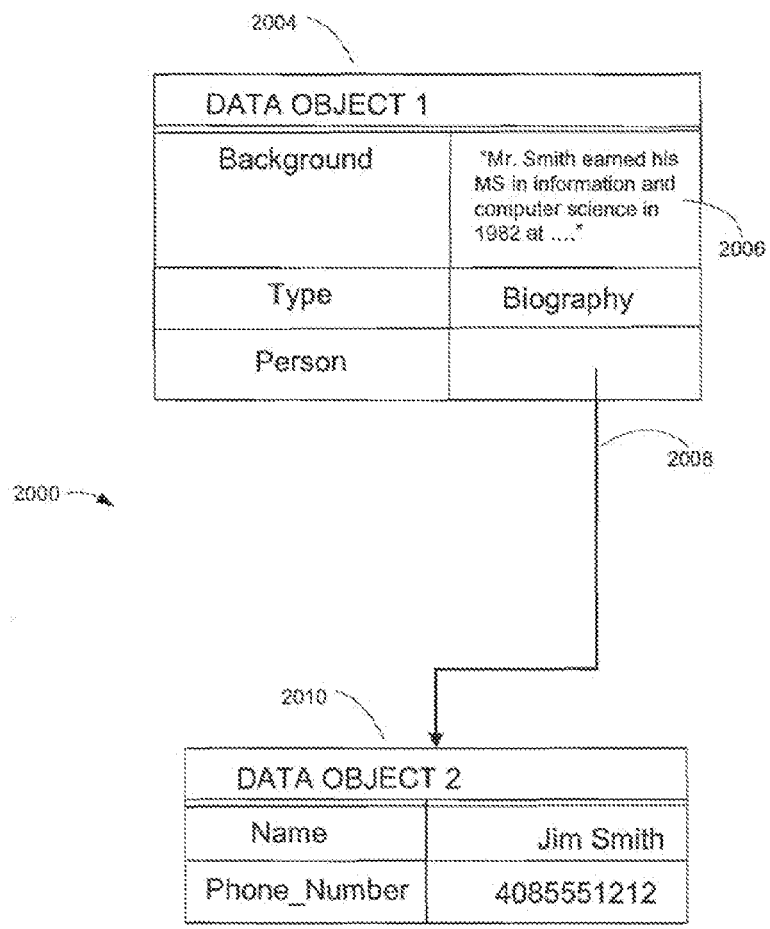
FIG. 20 illustrates an example data structure that may be described by the grammar rules of FIG. 19, according to an example embodiment.
Figure 21:
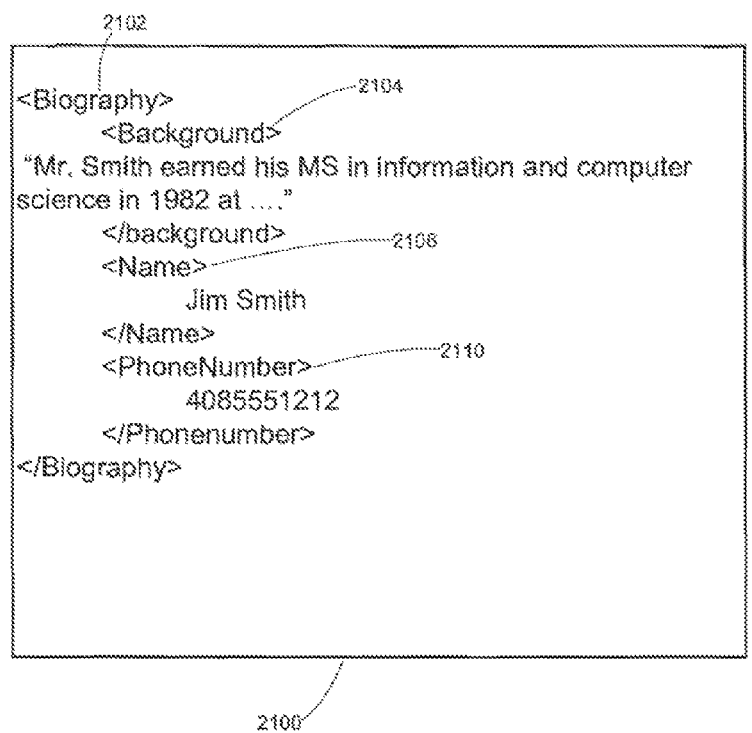
FIG. 21 illustrates an example of a textual representation 2100 that may be produced when the data structure of FIG. 20 is processed using the grammar rules of FIG. 19, according to an example embodiment.

In some embodiments, other grammar rules may need to scanned, beyond the grammar rule suitable for the data object being processed to select a grammar rule item during textual representation processing, as illustrated and described with respect to FIGS. 19 through 21.

FIG. 19 illustrates a pair of grammar rules that may, for example, be used to store an electronic document describing a person as shown on a company staff web page, in which a purely recursive output control instruction is illustrated, according to an example embodiment. In FIG. 19, the grammar rule 1900 may describe the structure of a simple biography page data object. For purposes of example, the grammar rule 1900 includes three grammar rule items 1906, 1908, and 1910 corresponding to a type indication of a data object, a string providing, for example, a summary of a person's background, and a reference to a person object, respectively. An example output control instruction 1912 indicates that when processing the 'Person' key/value pair, no output is to be emitted to a textual representation but rather that processing is to continue recursively to the associated data object.

A grammar rule 1920, suitable for a data object containing information about a person (e.g., name and phone number) is also illustrated in FIG. 19.

FIG. 20 illustrates an example data structure 2000 that may be described by the grammar rules of FIG. 19, according to an example embodiment. It will be appreciated that the data object 2010 is associated by reference to the data object 2004.

FIG. 21 illustrates an example of a textual representation 2100 that may be produced when the data structure 2000 of FIG. 20 is processed using the grammar rules of FIG. 19, according to an example embodiment.

To generate the textual representation 2100, a data structure parsing module 108, for example, may begin by processing data object 2004, using grammar rule 1900, writing out the "<Biography>" tag into the textual representation 2100. Processing may continue with the writing out of the "<Background>" tag 2104, the paragraph 2006 forming the value of the 'Background' key/value pair and the closing </Background> tag. In response to the presence of the 'Person' key/value pair the data structure parsing module may select the grammar rule item 1910, and carry out the indicated output control instruction, for example, not generating any textual elements into the textual representation but continuing processing recursively with data object 2010 following reference 2008. Processing of the data object 2010 may then occur using grammar rule 1920, generating tags 2016 and 2110 and their associated content before returning to processing of data object 2004.

When a textual representation generated using one or more grammar rules that include grammar rule items having purely recursive output control instructions, various recursively-referenced grammar rules and their items may need to be examined to find a matching grammar rule item for a given textual element.

For example, suppose for purposes of example that textual representation 2100 is processed by a textual representation parsing module 106. To commence the processing, the textual representation parsing module 106 may begin by selecting the grammar rule 1900 on the basis of the "<Biography>" tag 2102 or some other indication and creating a first data object. Processing may continue with the grammar rule items 1906 and 1908 to create a 'Type' key/value pair and a 'Background' key/value pair (e.g., in response to encountering the "<Background>" tag) in the newly created first data object. However, when the "<Name>" tag is encountered (which in this example, does not match any output control instruction in any grammar rule item in grammar rule 1900), the textual representation parsing module 106 may in response to the finding that a purely recursive output control instruction appears in the grammar rule 1900 may examine the grammar rule 1920 to attempt to select a grammar rule item from grammar rule 1920. Grammar rule 1920 may be chosen based on the type 1914 (e.g., "person") of the purely recursive grammar rule item 1910. It will be appreciated that a particular grammar rule may have more than one such purely recursive grammar rule item and that examination of more than one may be necessary, and that such searching for matching grammar rule items may be a recursive process itself.

Once a matching grammar rule item (e.g., has been found (e.g., 1926) has been found, the textual representation parsing module 106 may construct a second data object (and possibly intermediate data objects) and populate it accordingly based on the textual representation, eventually returning to the population of the first data object when further textual elements are encountered that again match grammar rule items associated with the first data object's suitable grammar rule.

Example Machines for Carrying Out Processes

Figure 22:
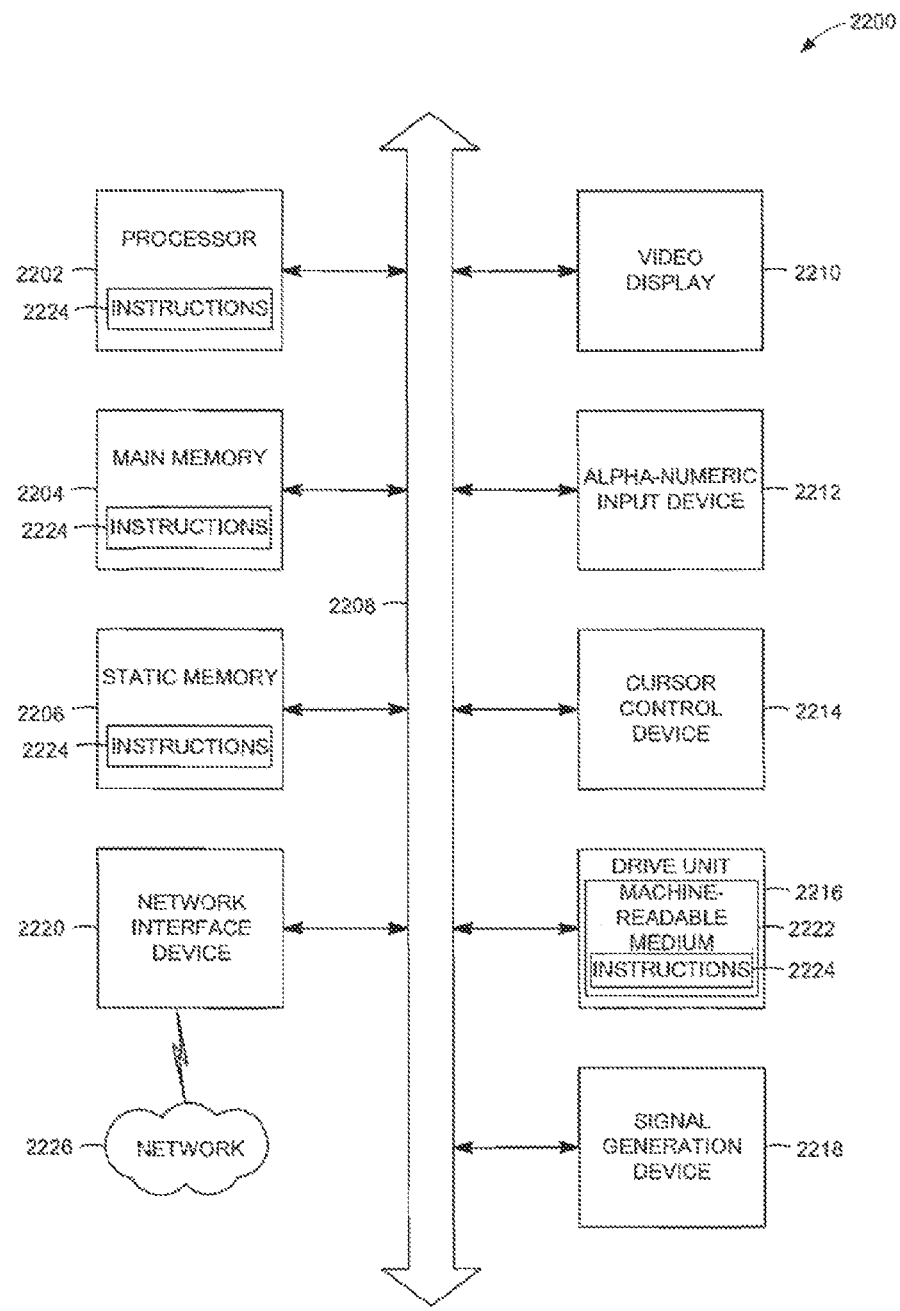
FIG. 22 shows a diagrammatic representation of machine in the example form of a computer system within which a set of instructions, for causing the machine to perform any one or more of the methodologies discussed herein, may be executed.

FIG. 22 shows a diagrammatic representation of machine in the example form of a computer system 2200 within which a set of instructions, for causing the machine to perform any one or more of the methodologies, methods, processes, or procedures discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2200 includes a processor 2202 (e.g., a central processing unit (CPU), a graphics processing unit (GPU) or both), a main memory 2204 and a static memory 2206, which communicate with each other via a bus 2208. The computer system 2200 may further include a video display unit 2210 (e.g., a liquid crystal display (LCD) or a cathode ray tube (CRT)). The computer system 2200 also includes an alphanumeric input device 2212 (e.g., a keyboard), a user interface (UI) navigation device 2214 (e.g., a mouse), a disk drive unit 2216, a signal generation device 2218 (e.g., a speaker) and a network interface device 2220.

The disk drive unit 2216 includes a machine-readable medium 2222 on which is stored one or more sets of instructions and data structures (e.g., software 2224) embodying or utilized by any one or more of the methodologies or functions described herein. The software 2224 may also reside, completely or at least partially, within the main memory 2204 and/or within the processor 2202 during execution thereof by the computer system 2200, the main memory 2204 and the processor 2202 also constituting machine-readable media.

The software 2224 may further be transmitted or received over a network 2226 via the network interface device 2220 utilizing any one of a number of well-known transfer protocols (e.g., HTTP).

While the machine-readable medium 2222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals An example technical problem that may be solved by various embodiments includes the difficulty of storing a data structure in a compact form on a storage device while retaining an ability to quickly and accurately reconstruct the data structure from the compact form for rapid in-memory processing.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   accessing, in at least one of a memory device and a data storage device, a first data object and a second data object of a data structure, the data structure representing a page description language document that includes page description language document content and non-page description language document content included or referenced in data objects of the page description language document, the second data object being associated with the first data object;
   selecting, based on first content included in the first data object, a grammar rule included in a grammar, the grammar rule including a grammar rule item, the grammar being a descriptive specification composed of grammar rules used to computationally determine content types to facilitate selection of grammar rules suitable to translate electronic content to a desired form utilizing grammar rule items;
   based on second content included in the second data object, selecting the grammar rule item included in the grammar rule, the second content being non-page description language document content;
   based on the second content and the grammar rule item, executing instructions on a computer processor to generate a portion of a markup language document representation of the page description language document; and
   wherein the non-page description language document content is at least one of digital video, frames or sets of frames of digital video, digital audio, an animation, an image, and a media stream.

2. The method of claim 1, wherein the second data object is a direct child of the first data object.

3. The method of claim 1, wherein the second data object is an indirect child of the first data object.

4. The method of claim 1, wherein the grammar rule includes a plurality of grammar rule items.

5. The method of claim 1, wherein the grammar rule includes a rule-level pre-processing instruction, and wherein the method further includes executing the rule-level preprocessing instruction in response to the selection of the grammar rule.

6. The method of claim 1, wherein the grammar rule includes a rule-level post-processing instruction, and wherein the method further includes executing the rule-level post-processing instruction after the generation of the portion of the markup language document representation.

7. The method of claim 1, wherein the second data object is contained in the first data object.

8. The method of claim 1, wherein the first content included in the first data object includes a type of the second data object, the type matching a type of the grammar rule.

9. The method of claim 1, wherein the grammar rule item includes output control instructions, and wherein the generating of the portion of the markup language document representation is according to the output control instructions.

10. The method of claim 9, wherein the portion of the markup language document representation includes content generated from the second content according to the output control instructions.

11. The method of claim 9, wherein the output control instructions are literally included within the grammar rule item.

12. The method of claim 9, wherein the output control instructions are implicit in the grammar rule item.

13. The method of claim 1, wherein the selecting of the grammar rule includes accessing a type of the second data object and matching a type of the grammar rule to the type of the second data object.

14. The method of claim 1, wherein the content of the data structure includes the second content.

15. The method of claim 1, wherein the second data object is included within the first data object.

16. The method of claim 1, wherein the second data object is a separate object from the first data object.

17. The method of claim 1, wherein the grammar rule is composed by inclusion of a plurality of grammar rules.

18. A system comprising:
   at least one processor;
   at least one memory device;
   at least one data storage device;
   a grammar store on the at least one data storage device storing a grammar rule, the grammar rule including a grammar rule item, the grammar being a descriptive specification composed of grammar rules used to computationally determine content types to facilitate selection of grammar rules suitable to translate electronic content to a desired form utilizing grammar rule items;
   a data structure parsing module retrievable from the at least one data storage device to the at least one memory device and executable by the at least one processor to access a first data object and a second data object of a data structure, the data structure representing a page description language document that includes page description language document content and non-page description language document content included or referenced in data objects of the page description language document, the second data object being associated with the first data object, to select, based on first content included in the first data object, the grammar rule, to select, based on second content of the second data object, the grammar rule item, and to generate, based on the second content and the grammar rule item, a portion of a first markup language document representation of the page description language document, the second content is non-page description language document content;
   a textual representation parsing module retrievable from the at least one data storage device to the at least one memory device and executable by the at least one processor to access a second markup language document representation of electronic content, the second markup language document representation including a first textual element semantically containing a second textual element, to select the grammar rule and to create a third data object for inclusion in a second page description language document, the selection of the grammar rule and the creation of the third data object being based on at least the first textual element, to select, based on at least third content in the second textual element, the grammar rule item, and to associate, according to the grammar rule item, a data element with the third data object, the data element including fourth content in the second textual element; and wherein the non-page description language document content is at least one of digital video, frames or sets of frames of digital video, digital audio, an animation, an image, and a media stream.

19. The system of claim 18, wherein the grammar rule includes a plurality of grammar rule items.

20. The system of claim 18, wherein the grammar rule includes a rule-level preprocessing instruction, and wherein the data structure parsing module is to execute the rule-level preprocessing instruction in response to the selection of the grammar rule.

21. The system of claim 18, wherein the grammar rule includes a rule-level post-processing instruction, and wherein the data structure parsing module is to execute the rule-level post-processing instruction after the generation of the portion of the markup language document representation.

22. The system of claim 18, wherein the second data object is contained in the first data object.

23. The system of claim 18, wherein the first content included in the first data object includes a type of the second data object, the type matching a type of the grammar rule.

24. The system of claim 18, wherein the grammar rule item includes output control instructions.

25. The system of claim 24, wherein the data structure parsing module is to generate the portion of the first markup language document representation according to the output control instructions.

26. The system of claim 25, wherein the portion of the first markup language document representation includes content generated from the second content according to the output control instructions.

27. The system of claim 24, wherein the output control instructions are literally included within the grammar rule item.

28. The system of claim 24, wherein the output control instructions are implicit in the grammar rule item.

29. The system of claim 24, wherein the textual representation parsing module is to select the grammar rule item based upon determining that the second textual element is generable according to the output control instructions.

30. The system of claim 18, wherein the data structure parsing module is to access a type of the second data object and to match a type of the grammar rule to the type of the second data object.

31. The system of claim 18, wherein the content of data structure includes the second content.

32. The system of claim 18, wherein the data element is a scalar data element.

33. The system of claim 18, wherein the data element is a compound data element.

34. The system of claim 33, wherein the data element is a data object.

35. The system of claim 18, wherein the grammar rule item includes an identifier and wherein the textual representation parsing module is to select the grammar rule item further based on the first content matching the identifier.

36. The system of claim 35, wherein the associating of the data element with the data object is facilitated by the identifier.

37. The system of claim 18, wherein the first textual element is a first markup language opening tag paired with a markup language closing tag, and wherein the second textual element is a second markup language opening tag located in the second markup language representation between the first markup language opening tag and the markup language closing tag and located within the next containment level below the first textual element.

38. The system of claim 18, wherein the second markup language representation is stored on a computer-readable medium.

39. The system of claim 18, wherein the grammar rule has an object type, and the data object is suited to the object type.

40. The system of claim 18, wherein the third content and the fourth content are the same content.

41. A non-transitory machine-readable medium embodying instructions, which when executed by a machine, cause the machine to perform a method including:

accessing a first data object and a second data object of a data structure, the data structure representing a page description language document that includes page description language document content and non-page description language document content included or referenced in data objects of the page description language document, the second data object being associated with the first data object;

selecting, based on first content included in the first data object, a grammar rule included in a grammar, the grammar rule including a grammar rule item, the grammar being a descriptive specification composed of grammar rules used to computationally determine content types to facilitate selection of grammar rules suitable to translated electronic content to a desired form utilizing grammar rule items;

based on second content included in the second data object, selecting the grammar rule item included in the grammar rule, the second content being non-page description, language document content;

based on the second content and the grammar rule item, generating a portion of a markup language document representation of the page description language document; and wherein the non-page description language document content is at least one of digital video, frames or sets of frames of digital video, digital audio, an animation, an image, and a media stream.

* * * * *